US012641536B2

(12) United States Patent　　　(10) Patent No.:　US 12,641,536 B2
Kim et al.　　　　　　　　　　　　(45) Date of Patent:　　May 26, 2026

(54) TECHNIQUE FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Suhwook Kim, Seoul (KR); Sungjin Park, Seoul (KR); Taewon Song, Seoul (KR); Insun Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 486 days.

(21) Appl. No.: 17/798,517

(22) PCT Filed: Feb. 10, 2021

(86) PCT No.: PCT/KR2021/001825
§ 371 (c)(1),
(2) Date: Aug. 9, 2022

(87) PCT Pub. No.: WO2021/162472
PCT Pub. Date: Aug. 19, 2021

(65) Prior Publication Data
US 2023/0083599 A1　　Mar. 16, 2023

(30) Foreign Application Priority Data

Feb. 10, 2020　(KR) ........................ 10-2020-0015866
Feb. 19, 2020　(KR) ........................ 10-2020-0020667

(51) Int. Cl.
*H04W 52/02*　　　(2009.01)

(52) U.S. Cl.
CPC ............................... *H04W 52/0216* (2013.01)

(58) Field of Classification Search
None
See application file for complete search history.

(56) References Cited

U.S. PATENT DOCUMENTS 11,596,021 B2 *　2/2023　Cariou ................... H04W 48/12
12,336,031 B2 *　6/2025　Kim ...................... H04W 76/15
(Continued)

FOREIGN PATENT DOCUMENTS

WO　　2018/048487 A1　3/2018

OTHER PUBLICATIONS

Qualcomm Inc., "Multi-Link Operation: Anchor Channel", IEEE 802.11-19/1526r3, Sep. 4, 2019, see slides 3-7.
(Continued)

*Primary Examiner* — Christopher T Wyllie
(74) *Attorney, Agent, or Firm* — BRYAN CAVE LEIGHTON PAISNER LLP

(57) ABSTRACT

According to various embodiments, a multi-link device (MLD) operating in a plurality of links may receive information regarding a plurality of groups into which the plurality of links are classified. The information regarding the plurality of groups may include information regarding IDs allocated to the plurality of groups and information regarding power saving (PS) intervals allocated to the plurality of groups. The multi-link device may change, on the basis of the information regarding the plurality of groups, at least one STA included in the multi-link device to be in a doze state.

8 Claims, 38 Drawing Sheets

(56)                    References Cited

U.S. PATENT DOCUMENTS

| | | | | |
|---|---|---|---|---|
| 12,471,143 B2 * | 11/2025 | Kim | | H04W 74/0816 |
| 2008/0310363 A1 * | 12/2008 | McBeath | | H04L 5/0023 |
| | | | | 370/344 |
| 2019/0037489 A1 | 1/2019 | Wang et al. | | |
| 2019/0109891 A1 * | 4/2019 | Paruchuri | | G06Q 50/06 |
| 2019/0158385 A1 * | 5/2019 | Patil | | H04W 76/15 |
| 2019/0158413 A1 * | 5/2019 | Patil | | H04W 28/0838 |
| 2020/0359259 A1 * | 11/2020 | Patil | | H04W 88/08 |
| 2021/0007168 A1 * | 1/2021 | Asterjadhi | | H04W 52/0235 |
| 2021/0014911 A1 * | 1/2021 | Patil | | H04L 1/1621 |
| 2021/0076398 A1 * | 3/2021 | Naribole | | H04W 74/0816 |
| 2021/0076412 A1 * | 3/2021 | Naribole | | H04W 76/15 |
| 2021/0112490 A1 * | 4/2021 | Cariou | | H04W 84/12 |
| 2021/0120599 A1 * | 4/2021 | Cariou | | H04W 88/08 |
| 2021/0136819 A1 * | 5/2021 | Seok | | H04L 1/0007 |
| 2021/0144637 A1 * | 5/2021 | Kwon | | H04W 80/02 |
| 2021/0144787 A1 * | 5/2021 | Kwon | | H04W 72/23 |
| 2021/0160347 A1 * | 5/2021 | Chu | | H04L 69/14 |
| 2021/0195578 A1 * | 6/2021 | Huang | | H04L 47/365 |
| 2021/0212141 A1 * | 7/2021 | Chu | | H04W 48/12 |
| 2021/0250963 A1 * | 8/2021 | Seok | | H04W 72/12 |
| 2021/0266931 A1 * | 8/2021 | Kwon | | H04W 60/005 |
| 2021/0282229 A1 * | 9/2021 | Stacey | | H04W 88/10 |
| 2021/0314846 A1 * | 10/2021 | Chu | | H04W 40/244 |
| 2022/0132423 A1 * | 4/2022 | Fang | | H04W 84/12 |
| 2022/0159106 A1 * | 5/2022 | Kim | | H04L 5/003 |
| 2022/0174768 A1 * | 6/2022 | Kim | | H04L 5/0048 |
| 2022/0394606 A1 * | 12/2022 | Yang | | H04W 16/14 |
| 2023/0046270 A1 * | 2/2023 | Huang | | H04L 1/22 |
| 2023/0083599 A1 * | 3/2023 | Kim | | H04W 52/0216 |
| | | | | 370/311 |
| 2023/0103810 A1 * | 4/2023 | Kim | | H04W 12/06 |
| | | | | 370/329 |
| 2023/0189071 A1 * | 6/2023 | Kim | | H04W 28/16 |
| | | | | 370/235 |
| 2023/0247668 A1 * | 8/2023 | Akhmetov | | H04W 74/0816 |
| | | | | 370/329 |
| 2023/0254732 A1 * | 8/2023 | Kneckt | | H04W 28/0284 |
| | | | | 370/229 |
| 2023/0292245 A1 * | 9/2023 | Cariou | | H04W 52/0206 |
| 2023/0337293 A1 * | 10/2023 | Kim | | H04W 74/006 |
| 2023/0422026 A1 * | 12/2023 | Jang | | H04W 8/26 |

OTHER PUBLICATIONS

Intel, "Multi-link power save operation", IEEE 802.11-19/1544r5, Jan. 16, 2020, see slides 6-12.
NXP, "Multiple Link Power Save", IEEE 802.11-19/1857r1, Nov. 6, 2019, see slides 3-5.

* cited by examiner (a)

Figure 4:
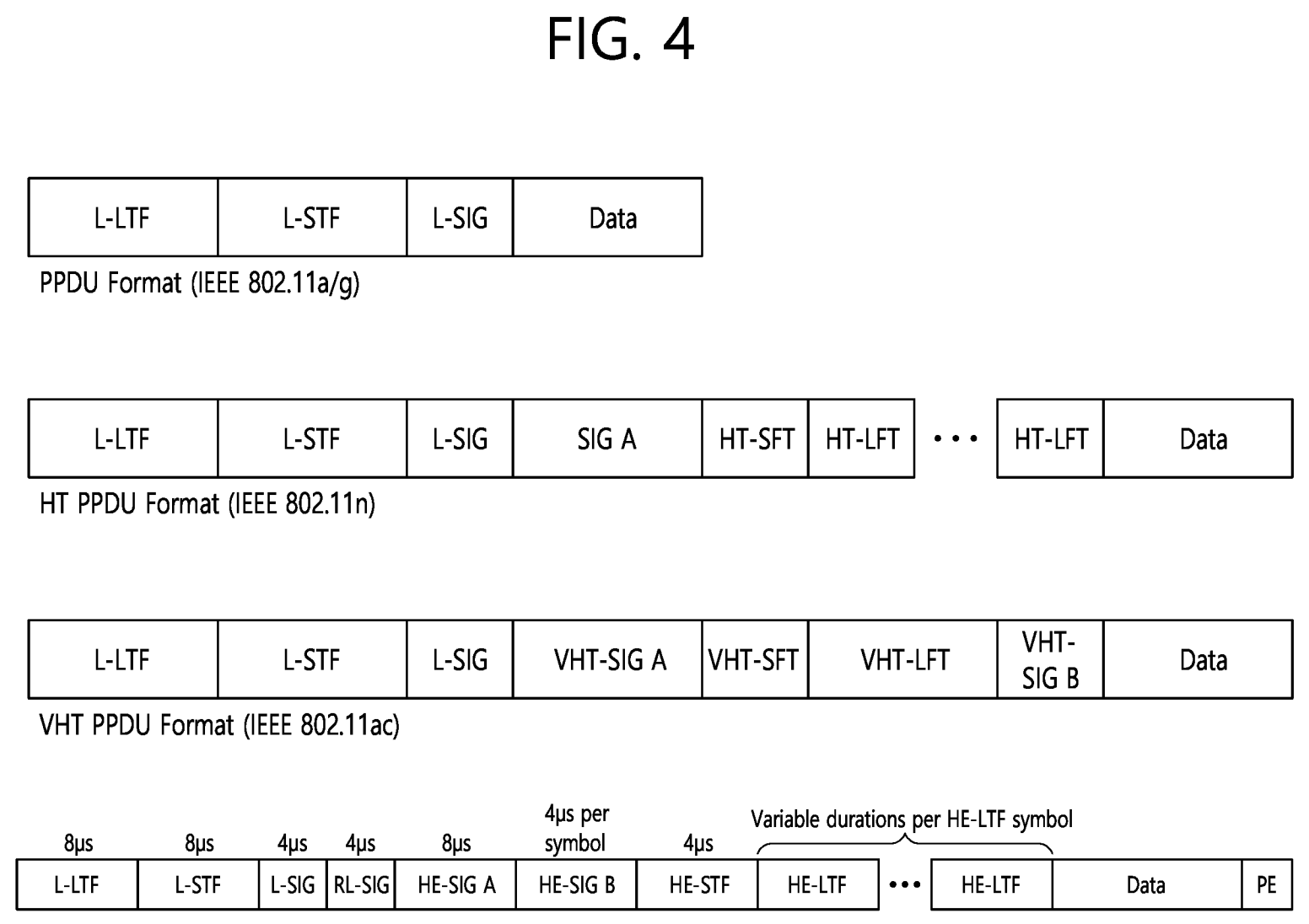

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ... | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| L-LTF | L-STF | L-SIG | RL-SIG | HE-SIG A | HE-SIG B | HE-STF | HE-LTF | ... | HE-LTF | Data | PE |
|---|---|---|---|---|---|---|---|---|---|---|---|
| 8µs | 8µs | 4µs | 4µs | 8µs | | 4µs | | | | | |

4µs per symbol

Variable durations per HE-LTF symbol

| 2000 | 2010 | 2020 | 2030 | 2040 | 2050 | 2060 | 2070 | |
|---|---|---|---|---|---|---|---|---|
| L-STF | L-LTF | L-SIG | HE-SIG A | HE-SIG B | HE-STF | HE-LTF | Data | first frequency band |
| L-STF | L-LTF | L-SIG | HE-SIG A | HE-SIG B | HE-STF | HE-LTF | Data | second frequency band |
| L-STF | L-LTF | L-SIG | HE-SIG A | HE-SIG B | HE-STF | HE-LTF | Data | third frequency band |
| L-STF | L-LTF | L-SIG | HE-SIG A | HE-SIG B | HE-STF | HE-LTF | Data | fourth frequency band |

4-time FFT

| Element ID | Length | Element ID Extension | OPS Duration |
|---|---|---|---|

Octets:         1             1                 1                  1

FIG. 31

```
┌─────────────────┐
│  Anchored Link  │
│   Indication    │
└─────────────────┘
```

FIG. 32

| Element ID | Length | Element ID Extension | Anchored Link List | Anchored Link Indication | OPS Duration |
|---|---|---|---|---|---|

FIG. 33

| Element ID | Length | Element ID Extension | Anchored Link List | Anchored Link Indication | OPS Duration 1 | OPS Duration 2 |
|---|---|---|---|---|---|---|

FIG. 34

| Element ID | Length | Element ID Extension | Anchored Link List | Multi-OPS Duration Per Link |
|---|---|---|---|---|

| Group Identifier 1 (Anchored Links) | Group id 1 Indication | OPS Duration 1 | Group Identifier 2 (non-Anchored Links) | Group id 2 Indication | OPS Duration 2 |
|---|---|---|---|---|---|

FIG. 35

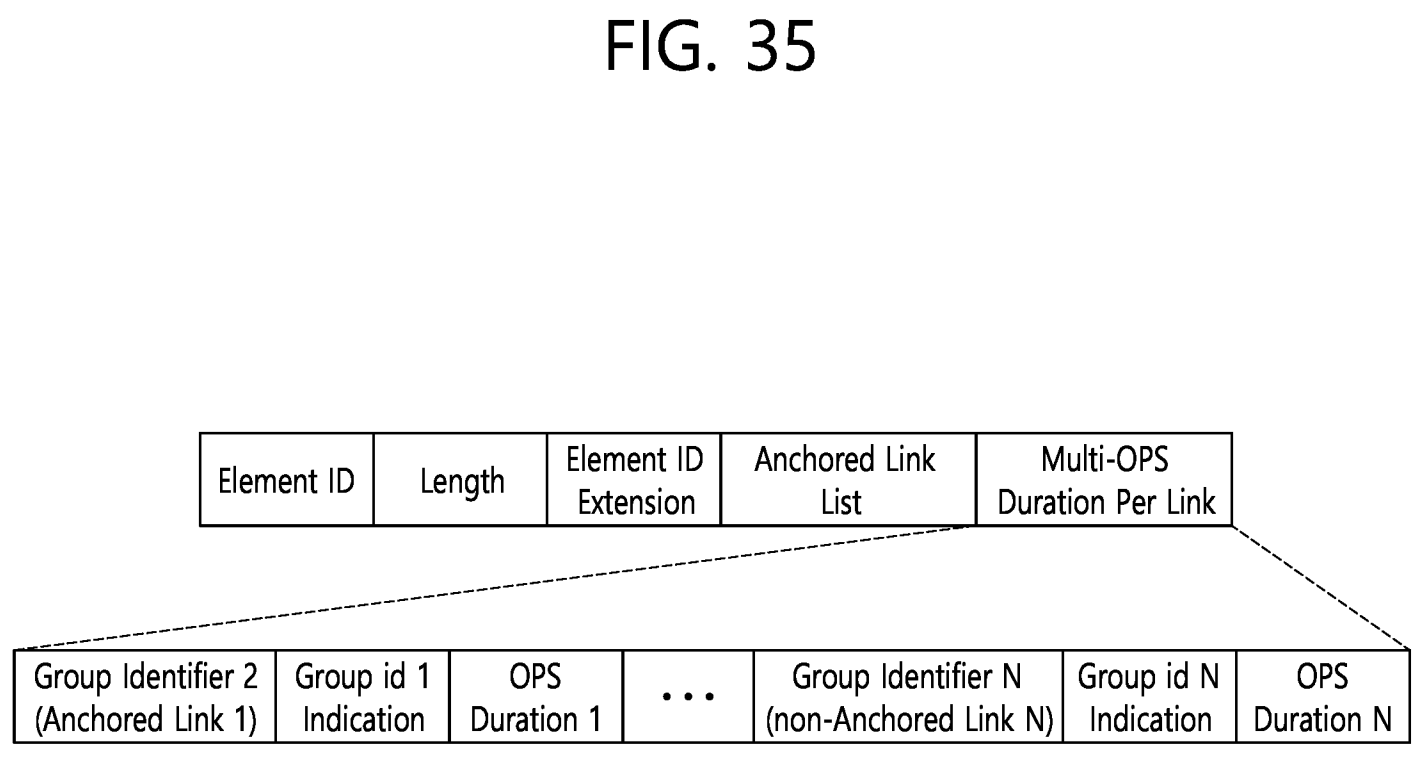

| Element ID | Length | Element ID Extension | Anchored Link List | Multi-OPS Duration Per Link |
|---|---|---|---|---|

| Group Identifier 2 (Anchored Link 1) | Group id 1 Indication | OPS Duration 1 | . . . | Group Identifier N (non-Anchored Link N) | Group id N Indication | OPS Duration N |
|---|---|---|---|---|---|---|

TECHNIQUE FOR PERFORMING MULTI-LINK COMMUNICATION IN WIRELESS COMMUNICATION SYSTEM

This application is the National Stage filing under 35 U.S.C. 371 of International Application No. PCT/KR2021/001825 filed on Feb. 10, 2021, which claims priority to Korean Patent Application Nos. 10-2020-0015866 filed on Feb. 10, 2020 and 10-2020-0020667 filed on Feb. 19, 2020, the contents of which are all hereby incorporated by reference herein in their entirety.

BACKGROUND

Field of the Disclosure

The present specification relates to a technique for performing multi-link communication in a wireless local area network (WLAN) system, and more particularly, to a method for performing a power saving (PS) operation in the multi-link communication and an apparatus supporting the method.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

The extreme high throughput (EHT) standard may use a wide bandwidth (e.g., 160/320 MHz), 16 streams, and/or a multi-link (or multi-band) operation to support a high throughput and a high data rate.

In the EHT standard, a multi-link device supporting a multi-link may include a plurality of stations (STAs). When some links among a plurality of links in which the plurality of STAs operate are not used, some of the links may operate in a doze state. Therefore, there may be a need for a technical feature for instructing an access point (AP) (or an AP multi-link device) to operate in the doze state for some links among the plurality of links.

According to various embodiments, a multi-link device (MLD) operating in a plurality of links may perform operations of: receiving a physical layer protocol unit (PPDU), wherein the plurality of links are classified into a plurality of groups, and wherein the PPDU includes information related to a group identifier (ID) assigned to the plurality of groups and information related to a power saving (PS) period assigned to the plurality of groups; identifying at least one group among the plurality of groups, based on the information related to the group ID assigned to the plurality of groups; and changing at least one station (STA) for the at least one group included in the MLD to a doze state, based on information related to the PS period assigned to the plurality of groups.

In the EHT standard (802.11be standard), a multi-link device (MLD) structure in which one AP/non-AP MLD supports several links is considered as a main technology. An STA included in the non-AP MLD may transfer information related to another STA in the non-AP MLD together through one link. Therefore, there is an advantage in that an overhead of frame exchange is reduced. In addition, there is an advantage in that link usage efficiency of the STA is increased, and the use of power consumption is decreased.

According to an embodiment, in a plurality of links (or a multi-link), a period for a power saving (PS) (or a period in which an operation is performed in a doze state) may be set differently, based on a characteristic of the link. Therefore, since the period for the PS for each link is set differently according to a link, an effective operation is possible in terms of power saving.

BRIEF DESCRIPTION OF THE DRAWINGS

FIG. 4 illustrates an example of a PPDU used in an IEEE standard.

FIG. 18 illustrates an example of a PPDU used in the present specification.

FIG. 20 shows an example of a HE-PPDU.

FIG. 23 illustrates a specific example of an OPS element.

FIG. 31 illustrates a specific example of an anchored link indication field (element).

FIG. 32 illustrates a specific example of an OPS element.

FIG. 33 illustrates a specific example of an OPS element.

FIG. 34 and FIG. 35 illustrate a specific example of an OPS element.

DETAILED DESCRIPTION

Figure 1:
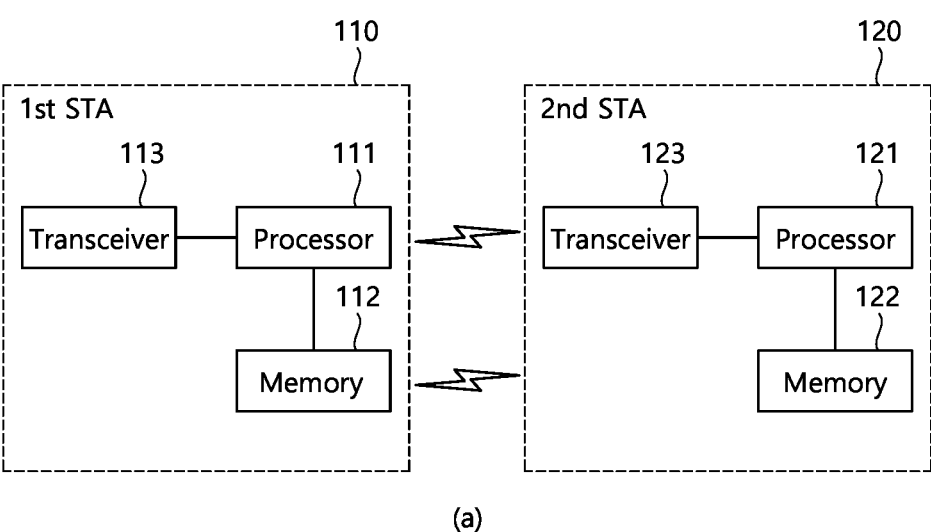
FIG. 1 shows an example of a transmitting apparatus and/or receiving apparatus of the present specification.
Figure 1:
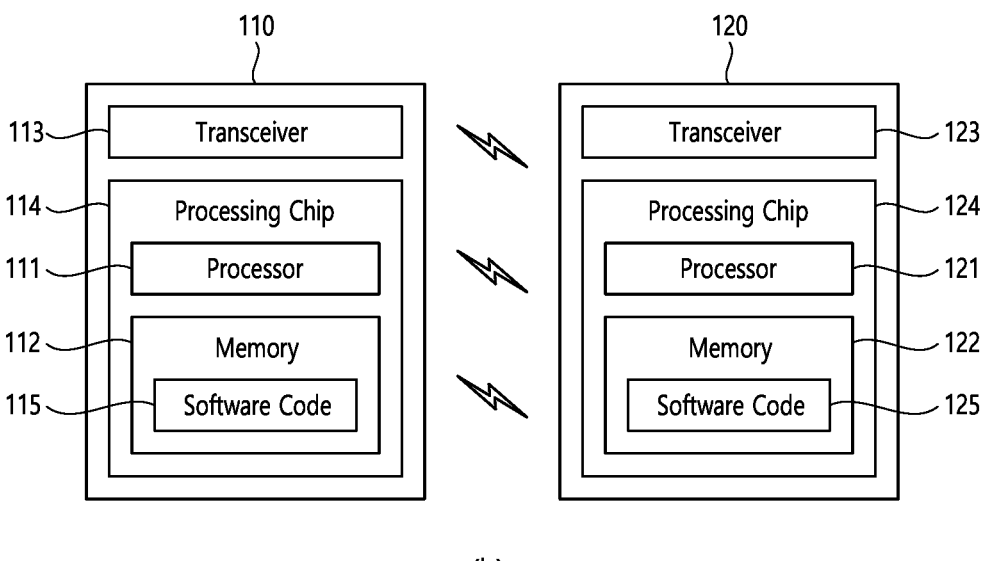

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
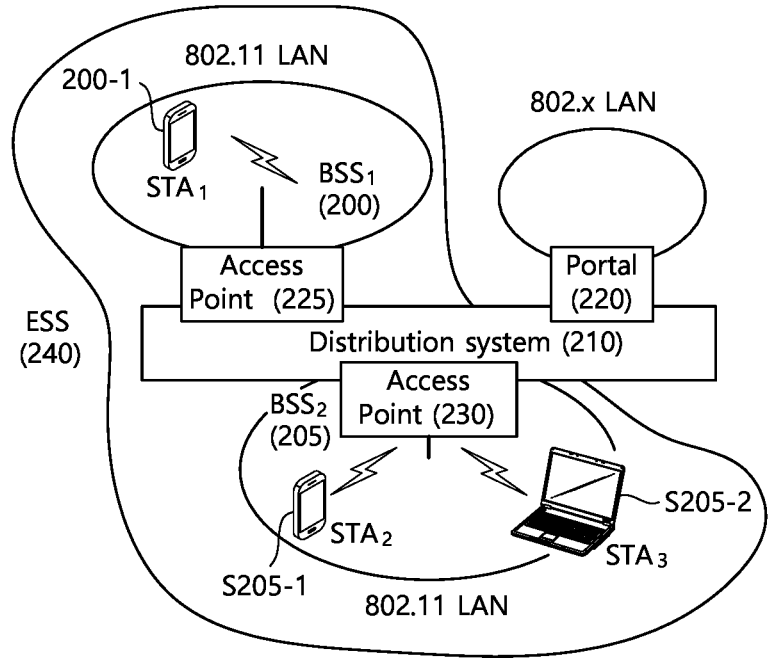
FIG. 2 is a conceptual view illustrating the structure of a wireless local area network (WLAN).
Figure 2:
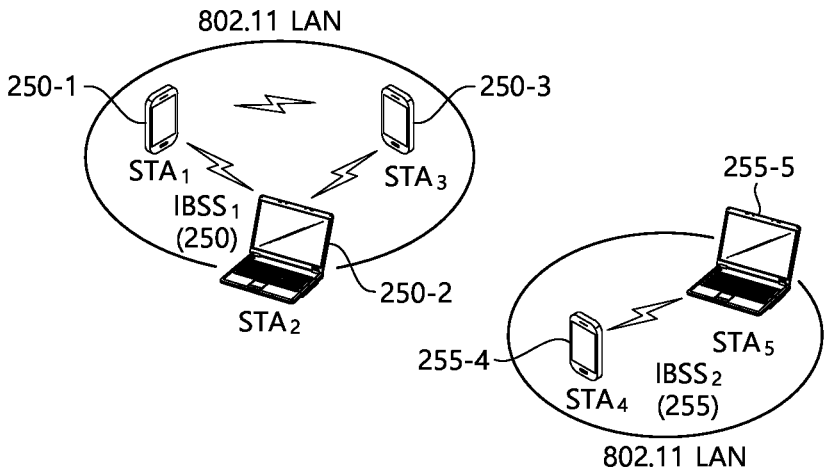

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
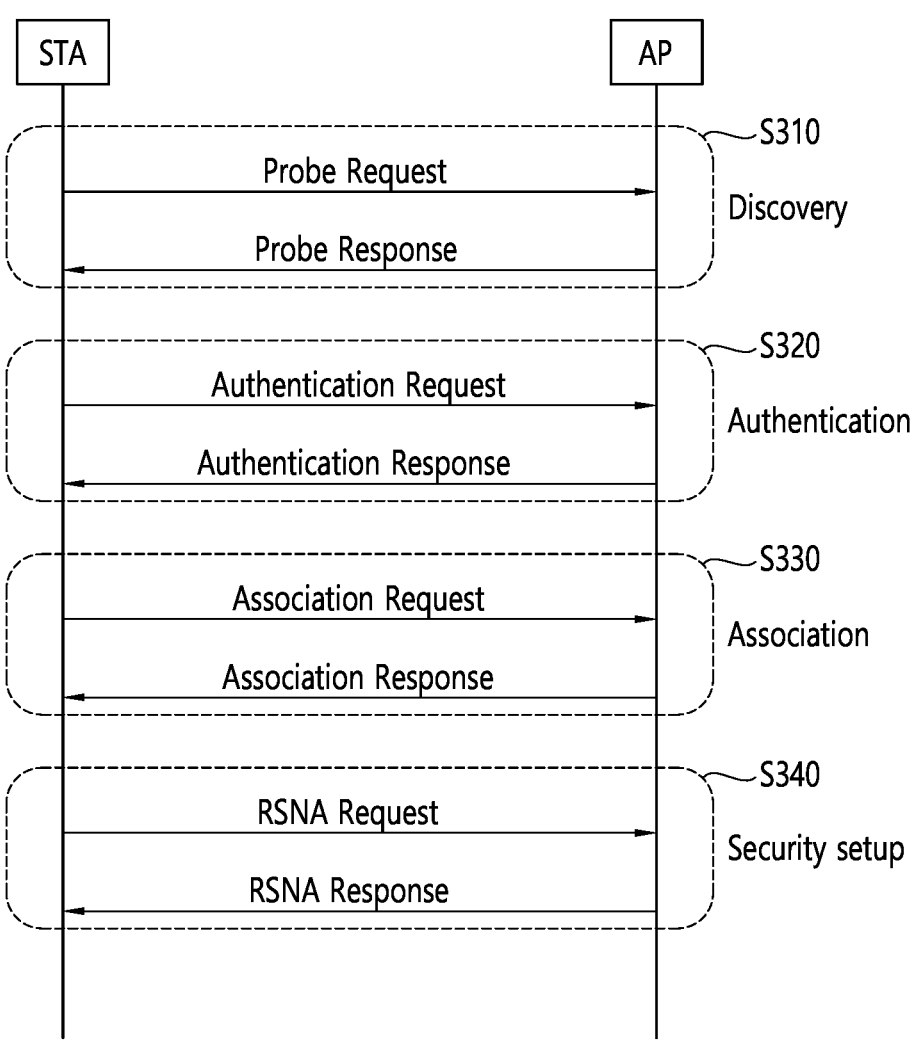
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/ response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
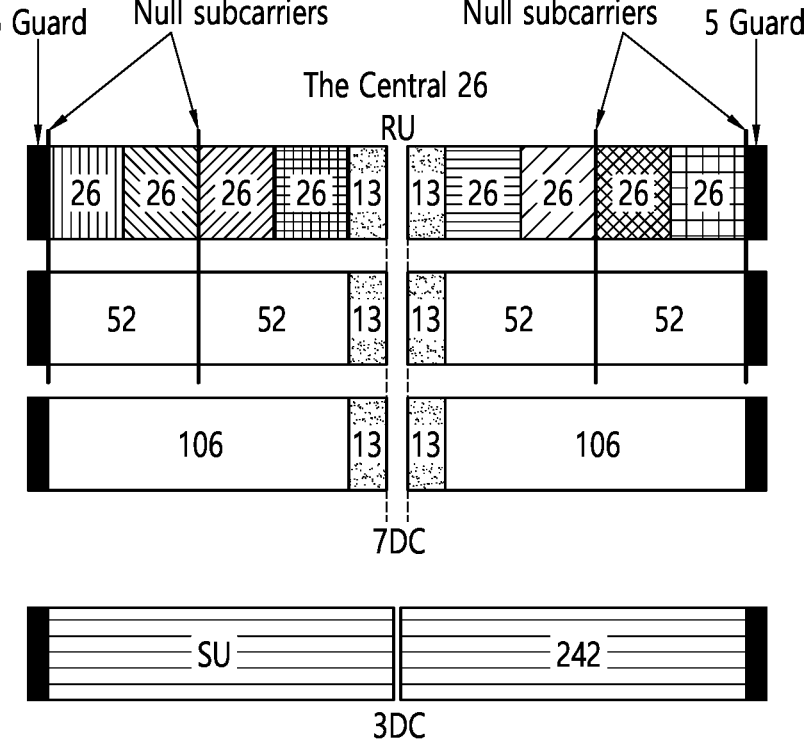
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
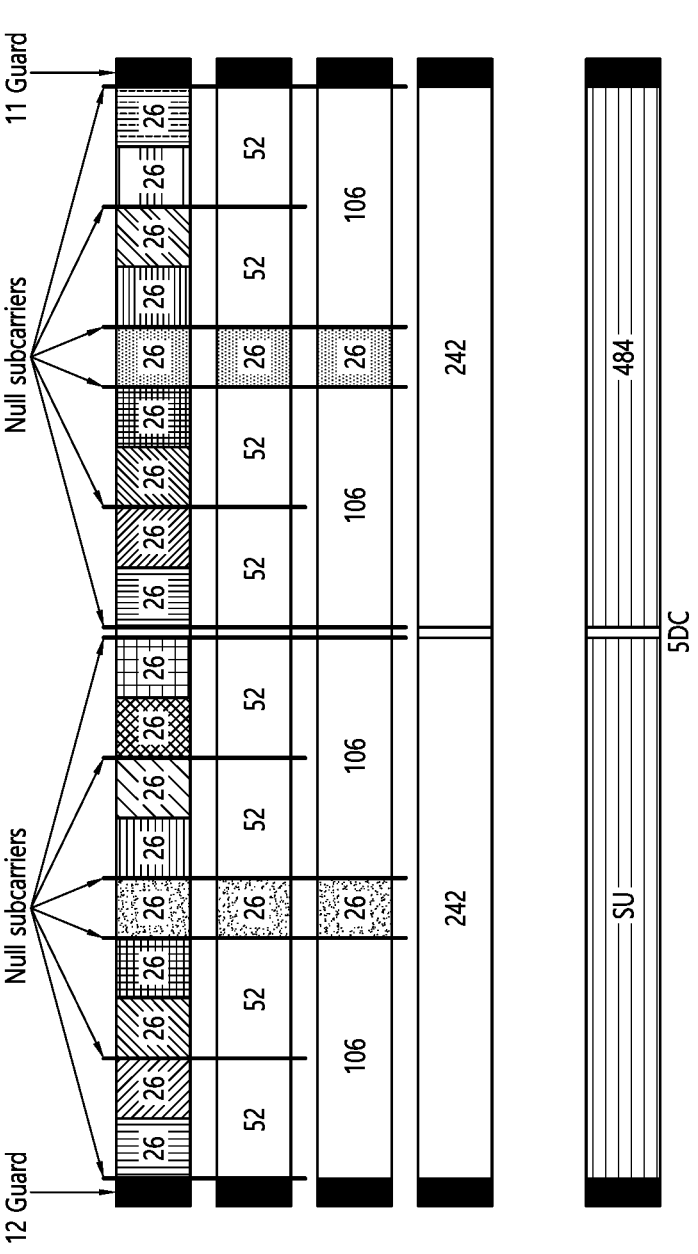
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
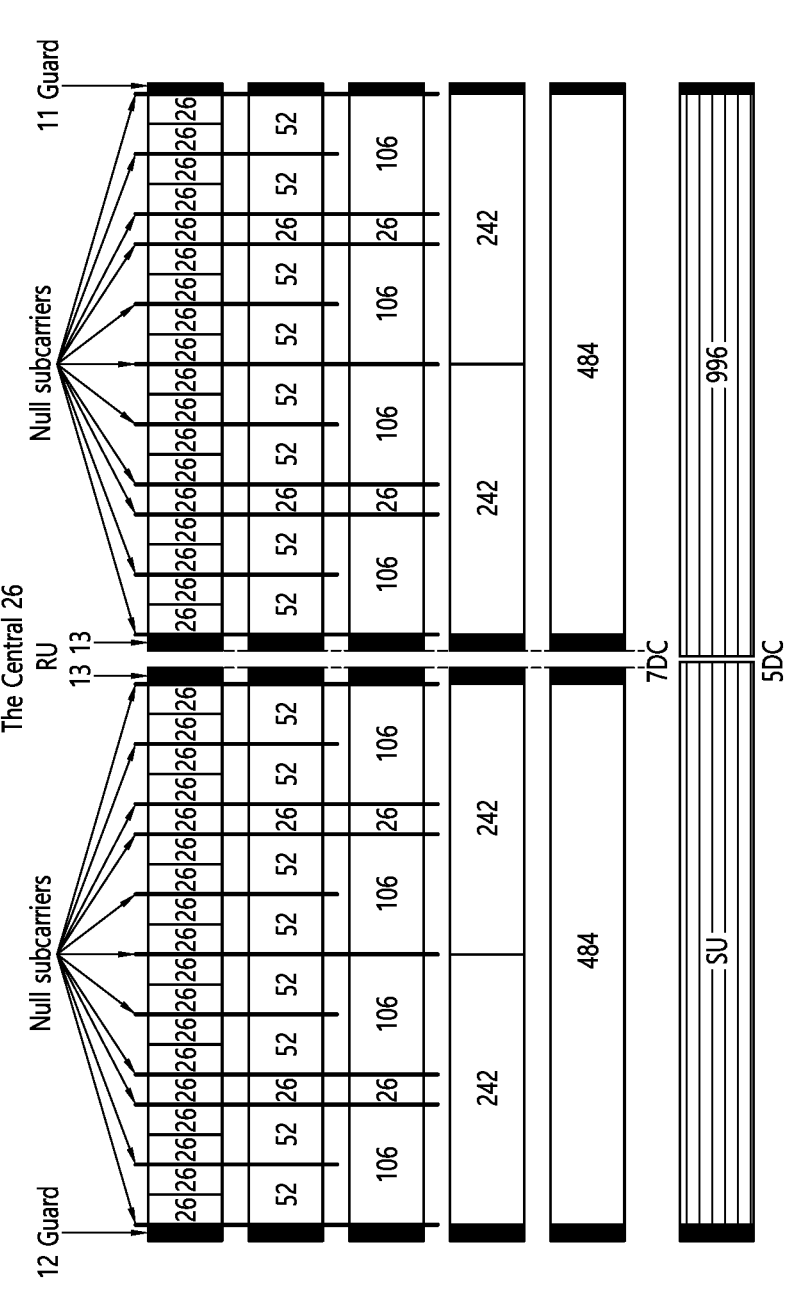
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
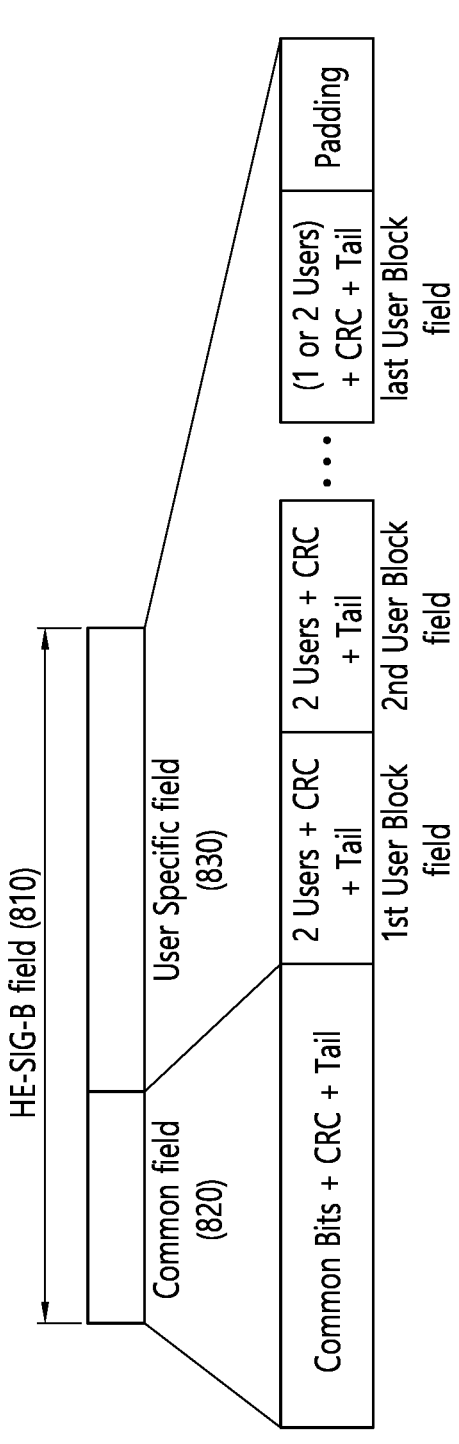
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |

"$01000y2y1y0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information $(y2y1y0)$. For example, when the 3-bit information $(y2y1y0)$ is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y2y1y0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
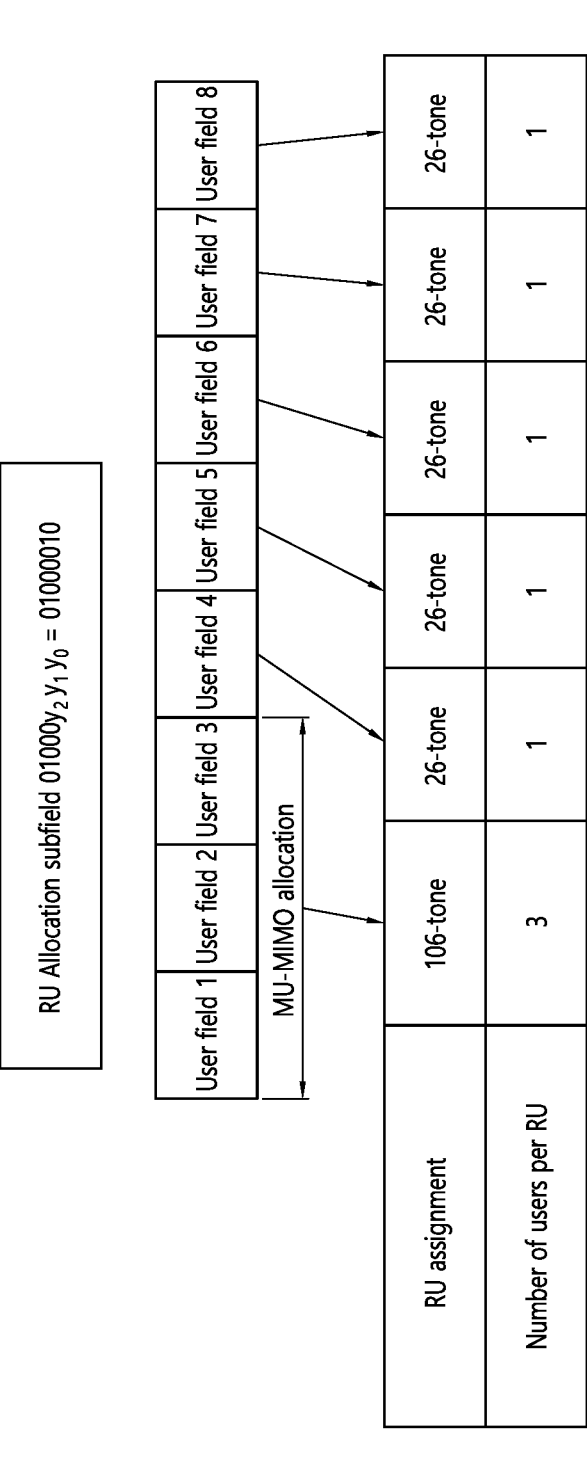
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

14 allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $N_{user}$ | B3 . . . B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 . . . B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
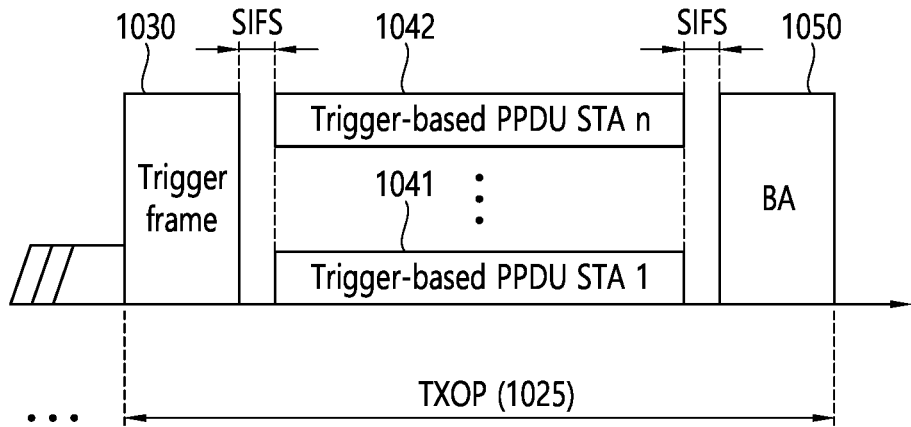
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
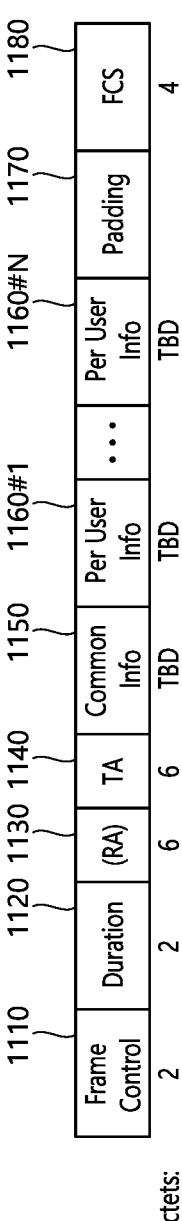
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
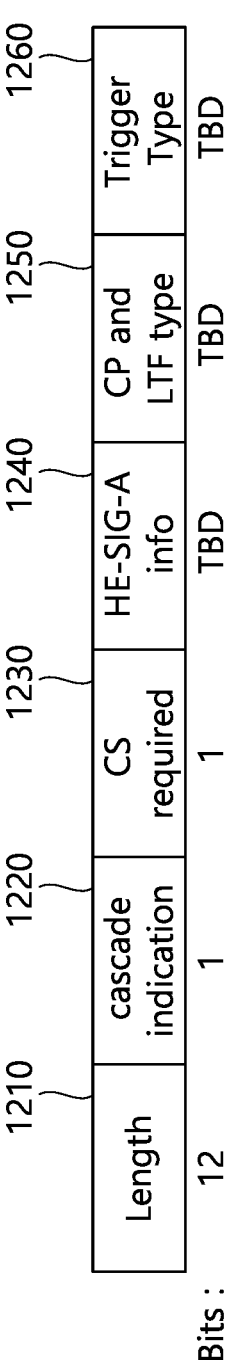
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
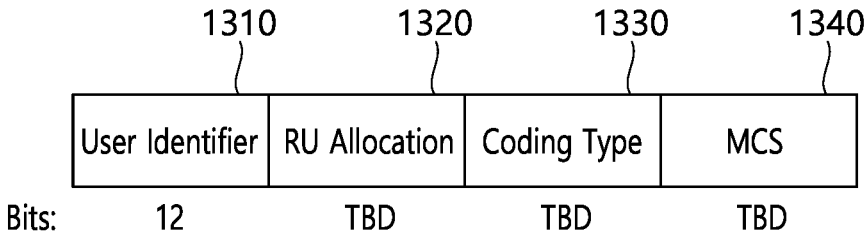
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
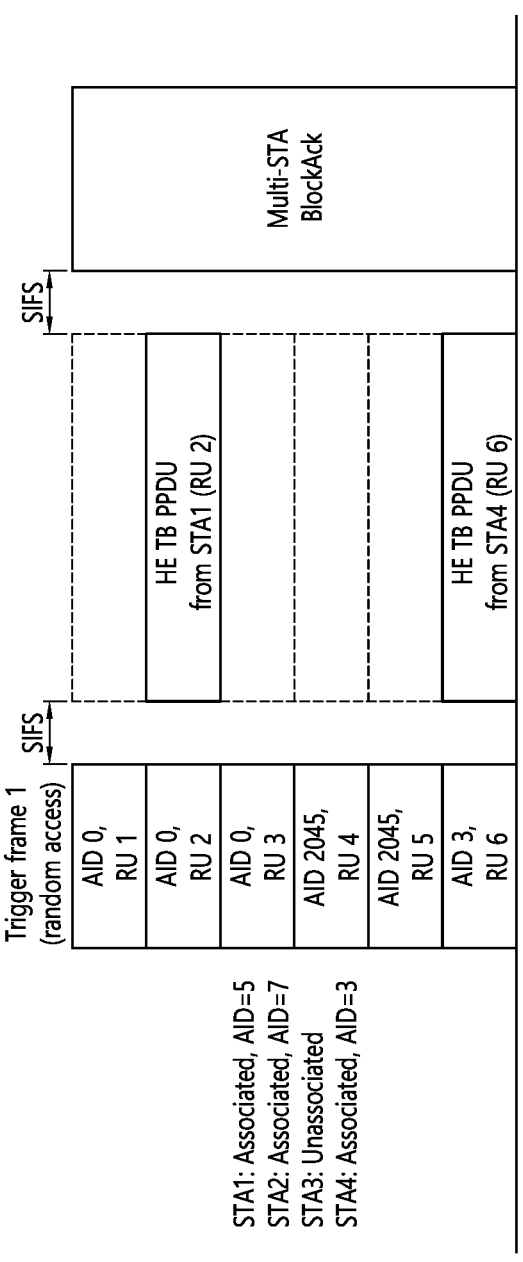
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
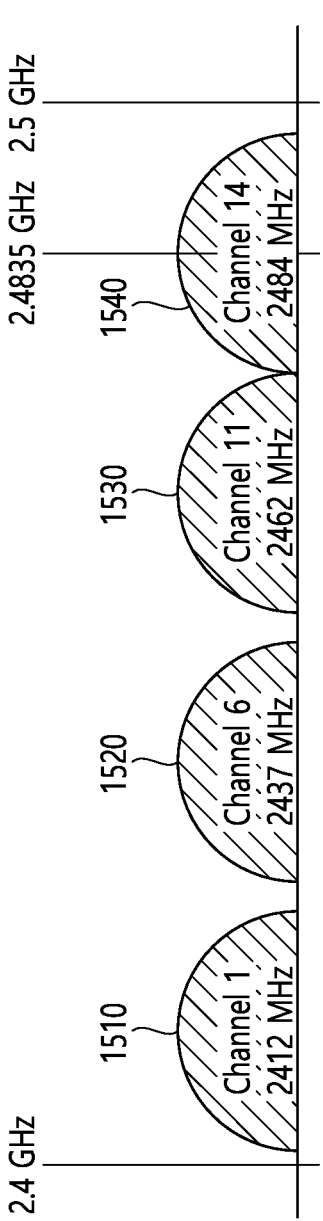
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
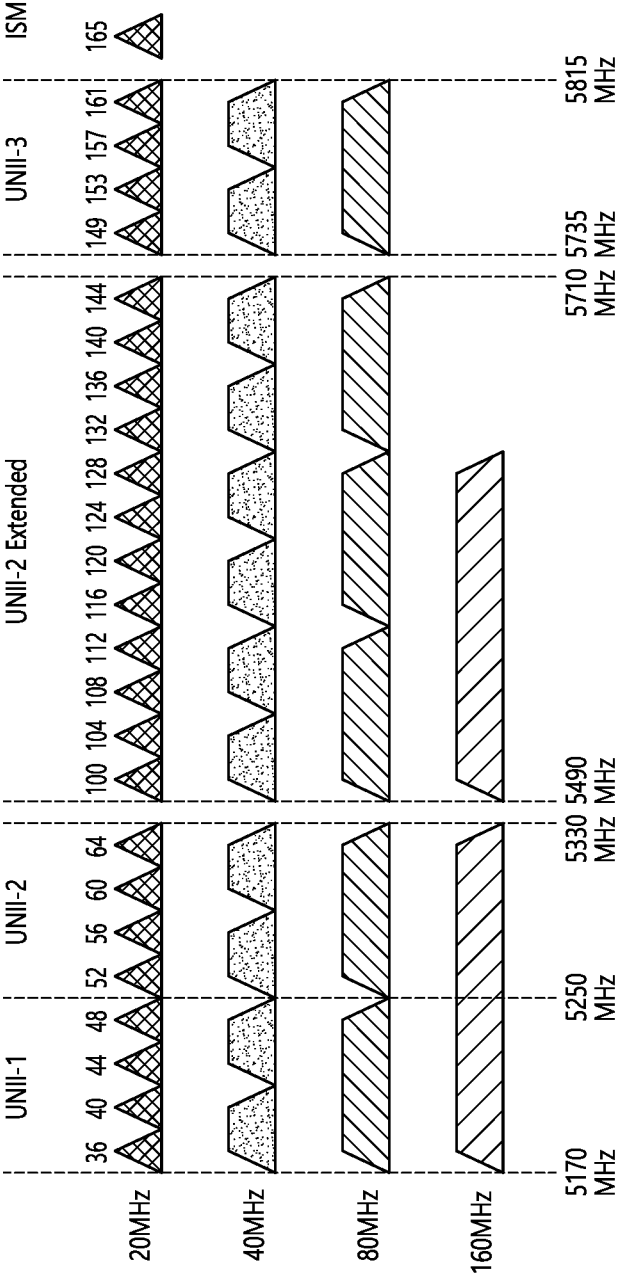
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
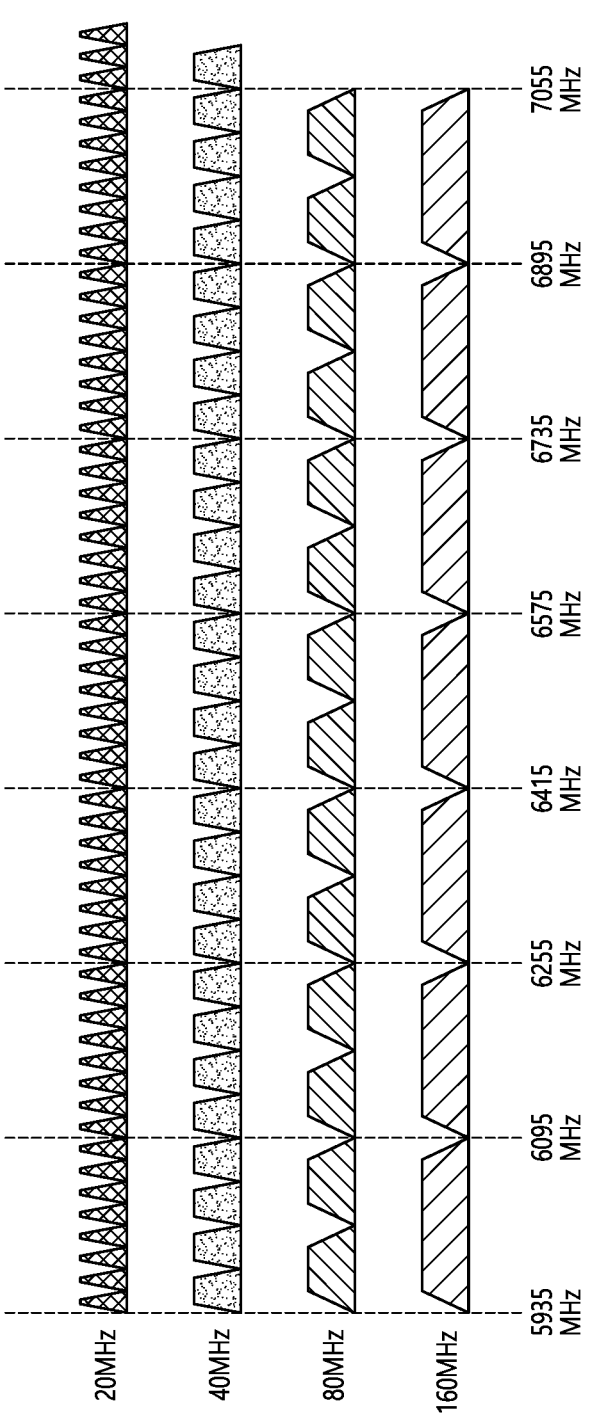
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
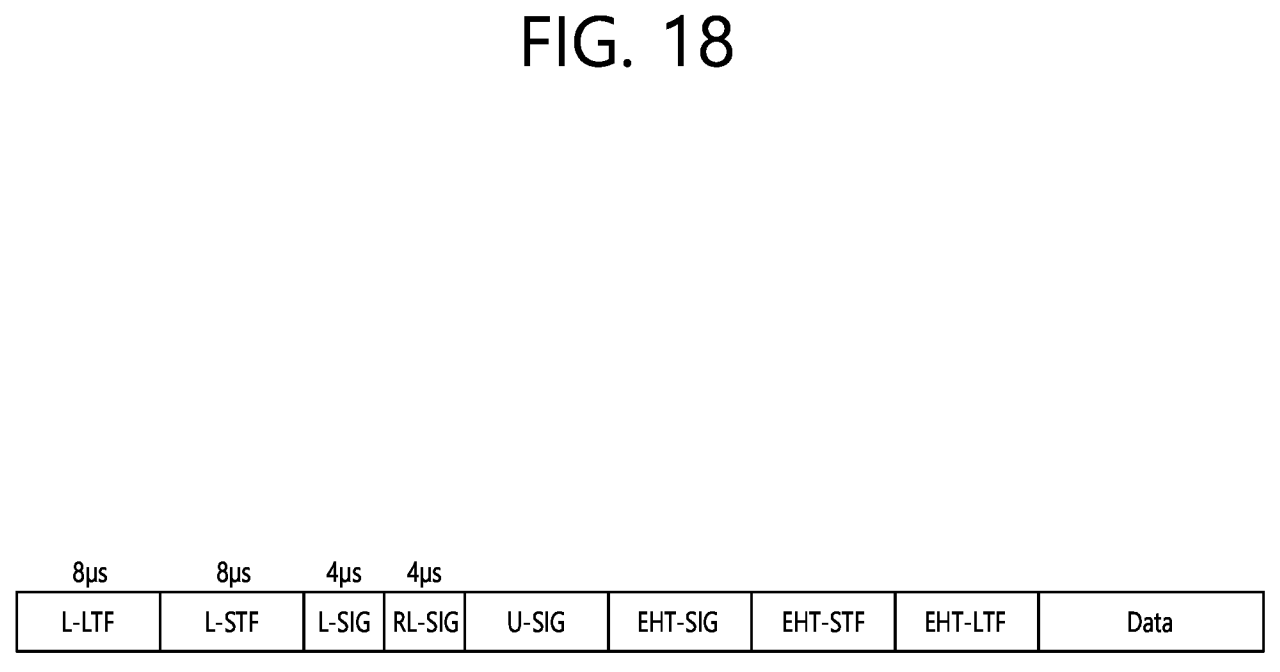

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU.

For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index+28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 |  | 1 |
| 2 | 26 | 26 | 26 | 26 | 26 | 52 |  | 26 | 26 | 1 |
| 3 | 26 | 26 | 26 | 26 | 26 | 52 |  | 52 |  | 1 |
| 4 | 26 | 26 | 52 |  | 26 | 26 | 26 | 26 | 26 | 1 |
| 5 | 26 | 26 | 52 |  | 26 | 26 | 26 | 52 |  | 1 |
| 6 | 26 | 26 | 52 |  | 26 | 52 |  | 26 | 26 | 1 |
| 7 | 26 | 26 | 52 |  | 26 | 52 |  | 52 |  | 1 |
| 8 |  | 52 | 26 | 26 | 26 | 26 | 26 | 26 | 26 | 1 |
| 9 |  | 52 | 26 | 26 | 26 | 26 | 26 | 52 |  | 1 |
| 10 |  | 52 | 26 | 26 | 26 | 52 |  | 26 | 26 | I |
| 11 |  | 52 | 26 | 26 | 26 | 52 |  | 52 |  | 1 |
| 12 |  | 52 |  | 52 | 26 | 26 | 26 | 26 | 26 | 1 |
| 13 |  | 52 |  | 52 | 26 | 26 | 26 | 52 |  | 1 |

TABLE 5-continued

| Indices | #1 | #2 | #3 | #4 | #5 | #6 | #7 | #8 | #9 | Number of entries |
|---|---|---|---|---|---|---|---|---|---|---|
| 14 |  | 52 |  | 52 | 26 | 52 |  | 26 | 26 | 1 |
| 15 |  | 52 |  | 52 | 26 | 52 |  | 52 |  | 1 |
| 16 | 26 | 26 | 26 | 26 | 26 |  | 106 |  |  | 1 |
| 17 | 26 | 26 |  | 52 | 26 |  | 106 |  |  | 1 |
| 18 |  | 52 | 26 | 26 | 26 |  | 106 |  |  | 1 |
| 19 |  | 52 |  | 52 | 26 |  | 106 |  |  | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |  |  | 106 |  |  | 26 | 26 | 26 | 26 | 1 |
| 21 |  |  | 106 |  |  | 26 | 26 | 26 | 52 | 1 |
| 22 |  |  | 106 |  |  | 26 | 52 |  | 26 | 1 |
| 23 |  |  | 106 |  |  | 26 | 52 |  | 52 | 1 |
| 24 |  | 52 |  | 52 | — |  | 52 |  | 52 | 1 |
| 25 |  | 242-tone RU empty (with zero users) |  |  |  |  |  |  |  | 1 |
| 26 |  |  | 106 |  |  | 26 |  | 106 |  | 1 |
| 27-34 |  |  |  |  | 242 |  |  |  |  | 8 |
| 35-42 |  |  |  |  | 484 |  |  |  |  | 8 |
| 43-50 |  |  |  |  | 996 |  |  |  |  | 8 |
| 51-58 |  |  |  |  | 2*996 |  |  |  |  | 8 |
| 59 | 26 | 26 | 26 | 26 | 26 |  | 52 + 26 |  | 26 | 1 |
| 60 | 26 |  | 26 + 52 |  | 26 | 26 | 26 | 26 | 26 | 1 |
| 61 | 26 |  | 26 + 52 |  | 26 | 26 | 26 | 52 |  | 1 |
| 62 | 26 |  | 26 + 52 |  | 26 | 52 |  | 26 | 26 | 1 |
| 63 | 26 | 26 |  | 52 | 26 |  | 52 + 26 |  | 26 | 1 |
| 64 | 26 |  | 26 + 52 |  | 26 |  | 52 + 26 |  | 26 | 1 |
| 65 | 26 |  | 26 + 52 |  | 26 | 52 |  | 52 |  | 1 |

TABLE 7

| Indices | #1 | #2 | #3 | #4 | #5 | #6 | #7 | #8 | #9 | Number of entries |
|---|---|---|---|---|---|---|---|---|---|---|
| 66 | 52 |  | 26 | 26 | 26 |  | 52 + 26 |  | 26 | 1 |
| 67 | 52 |  |  | 52 | 26 |  | 52 + 26 |  | 26 | 1 |
| 68 | 52 |  |  | 52 + 26 |  | 52 |  | 52 |  | 1 |
| 69 | 26 | 26 | 26 | 26 |  |  | 26 + 106 |  |  | 1 |
| 70 | 26 |  | 26 + 52 |  | 26 |  | 106 |  |  | 1 |
| 71 | 26 | 26 |  | 52 |  |  | 26 + 106 |  |  | 1 |
| 72 | 26 |  | 26 + 52 |  |  |  | 26 + 106 |  |  | 1 |
| 73 |  | 52 |  | 26 | 26 |  | 26 + 106 |  |  | 1 |
| 74 |  | 52 |  | 52 |  |  | 26 + 106 |  |  | 1 |
| 75 |  | 106 + 26 |  |  |  | 26 | 26 | 26 | 26 | 1 |
| 76 |  | 106 + 26 |  |  |  | 26 | 26 | 52 |  | 1 |
| 77 |  | 106 + 26 |  |  |  | 52 |  | 26 | 26 | 1 |
| 78 |  | 106 |  |  | 26 |  | 52 + 26 |  | 26 | 1 |
| 79 |  | 106 + 26 |  |  |  |  | 52 + 26 |  | 26 | 1 |
| 80 |  | 106 + 26 |  |  |  | 52 |  | 52 |  | 1 |
| 81 |  | 106 + 26 |  |  |  |  | 106 |  |  | 1 |
| 82 |  | 106 |  |  |  |  | 26 + 106 |  |  | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,1,-1,1\} \qquad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2) \qquad \text{<Equation 2>}$$

EHT-STF(0)=0

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \qquad \text{<Equation 3>}$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}* \\ (1+j)/\text{sqrt}(2) \qquad \text{<Equation 4>}$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,- \\ M,-1,M,0,-M,1,-M\}*(1+j)/\text{sqrt}(2) \qquad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}* \\ (1+j)/\text{sqrt}(2) \qquad \text{<Equation 6>}$$

Equation 7 to Equation 11 below relate to an example of a second type (i.e., 2×STF) sequence.

$$\text{EHT-STF}(-120{:}8{:}120)=\{M,0,-M\}*(1+j)/\text{sqrt}(2) \qquad \text{<Equation 7>}$$

The EHT-STF for the 40 MHz PPDU may be configured based on the following equation.

$$\text{EHT-STF}(-248{:}8{:}248)=\{M,-1,-M,0,M,-1,M\}* \\ (1+j)/\text{sqrt}(2) \qquad \text{<Equation 8>}$$

EHT-STF(−248)=0
EHT-STF(248)=0

The EHT-STF for the 80 MHz PPDU may be configured based on the following equation.

$$\text{EHT-STF}(-504{:}8{:}504)=\{M,-1,M,-1,-M,-1,M,0,-M, \\ 1,M,1,-M,1,-M\}*(1+j)/\text{sqrt}(2) \qquad \text{<Equation 9>}$$

The EHT-STF for the 160 MHz PPDU may be configured based on the following equation.

$$\text{EHT-STF}(-1016{:}16{:}1016)=\{M,-1,M,-1,-M,-1,M,0,- \\ M,1,M,1,-M,1,-M,0,-M,1,-M,1,M,1,-M,0,-M,1, \\ M,1,-M,1,-M\}*(1+j)/\text{sqrt}(2) \qquad \text{<Equation 10>}$$

EHT-STF(−8)=0, EHT-STF(8)=0,
EHT-STF(−1016)=0, EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504{:}8{:}504)=\{-M,1,-M,1,M,1,-M,0,-M,1, \\ M,1,-M,1,-M\}*(1+j)/\text{sqrt}(2) \qquad \text{<Equation 11>}$$

EHT-STF(−504)=0,
EHT-STF(504)=0

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
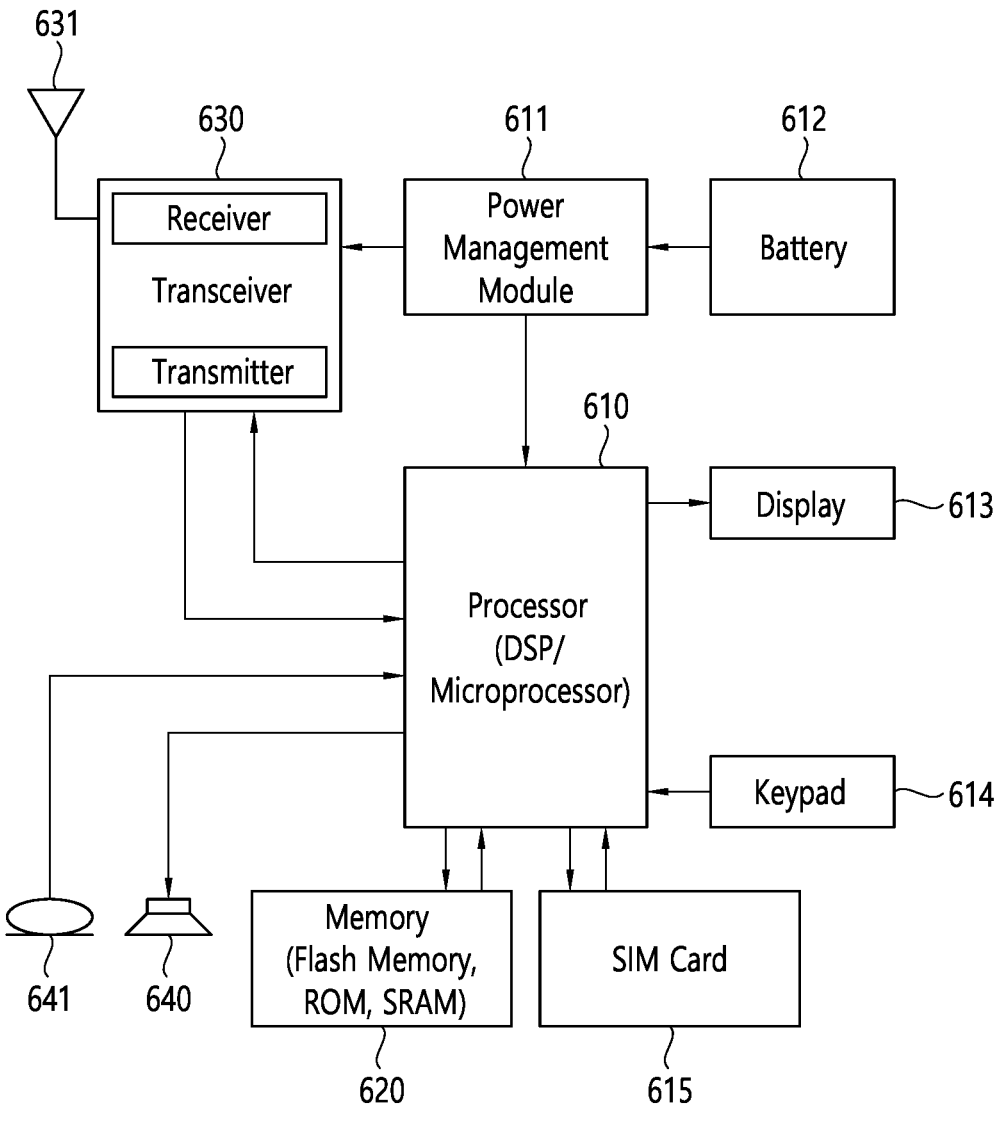
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

FIG. 20 shows an example of a HE-PPDU.

The illustrated L-STF 2000 may include a short training orthogonal frequency division multiplexing symbol (OFDM). The L-STF 2000 may be used for frame detection, automatic gain control (AGC), diversity detection, and coarse frequency/time synchronization.

The L-LTF 2010 may include a long training orthogonal frequency division multiplexing symbol (OFDM). The L-LTF 2010 may be used for fine frequency/time synchronization and channel estimation.

The L-SIG 2020 may be used to transmit control information. The L-SIG 2020 may include information related to a data transmission rate and a data length. Also, the L-SIG 2020 may be repeatedly transmitted. That is, the L-SIG 2020 may be configured in a repeated format (e.g., may be referred to as R-LSIG).

The HE-SIG-A 2030 may include control information common to the receiving station(s).

Specifically, the HE-SIG-A 2030 may include information related to: 1) a DL/UL indicator; 2) a BSS color field that is an identifier of the BSS; 3) a field indicating the remaining time of the current TXOP duration/period; 4) a Bandwidth field indicating whether 20, 40, 80, 160, 80+80 MHz; 5) a field indicating MCS scheme applied to the HE-SIG-B; 6) an indication field indicating whether modulation dual subcar-
rier modulation (DCM) is applied to the HE-SIG-B for
MCS; 7) a field indicating the number of symbols used for
HE-SIG-B; 8) a field indicating whether the HE-SIG-B is
generated over the full/entire band; 9) a field indicating the
number of symbols of the HE-LTF; 10) a field indicating a
length of the HE-LTF and a CP length; 11) a field indicating
whether additional OFDM symbols exist for LDPC coding;
12) a field indicating control information related to Packet
Extension (PE); and/or 13) a field indicating information
related to a CRC field of the HE-SIG-A, and the like. At least one field of the HE-SIG-A may be omitted or changed. In
addition, some fields may be added or omitted in other
environments where the HE-SIG-A is not a multi-user (MU)
environment.

Also, the HE-SIG-A 2030 may be composed of two parts:
HE-SIG-A1 and HE-SIG-A2. The HE-SIG-A1 and HE-SIG-
A2 included in the HE-SIG-A may be defined in the fol-
lowing format structure (field) according to a corresponding
PPDU. First, the HE-SIG-A field of the HE SU PPDU may
be defined as follows.

TABLE 8

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 9

| Two Parts of HE-SIG-A | Bit | Field | Number of bits | Description |
|---|---|---|---|---|
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC |
| | B8-B13 | BSS Color | 6 | The BSS Color field is an identifier of the BSS. Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP- |

TABLE 9-continued

| Two Parts of HE-SIG-A | Bit | Field | Number of bits | Description |
|---|---|---|---|---|
| | | | | based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |

TABLE 10

| Two Parts of HE-SIG-A | Bit | Field | Number of bits | Description |
|---|---|---|---|---|
| | B21-B22 | GI + LTF Size | 2 | Indicates the GI duration and HE-LTF size. Set to 0 to indicate a 1x HE-LTF and 0.8 µs GI Set to 1 to indicate a 2x HE-LTF and 0.8 µs GI Set to 2 to indicate a 2x HE-LTF and 1.6 µs GI Set to 3 to indicate: a 4x HE-LTF and 0.8 µs GI if both the DCM and STBC fields are 1. Neither DCM nor STBC shall be applied if both the DCM and STBC fields are set to 1. a 4x HE-LTF and 3.2 µs GI, otherwise |
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU)or HE-SIG-A3 (HE ER SU PPDU) | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURAT1ON is less than 512, then B0 is set to 0 and B1-B6 is set to floor(TXOP_DURATION/8). Otherwise, B0 is set to 1 and B1-B6 is set to floor ((TXOP_DURATION − 512)/128) where B0 indicates the TXOP length granularity. Set to 0 for 8 µs; otherwise set to 1 for 128 µs. B1-B6 indicates the scaled value of the TXOP_DURATION |
| | B7 | Coding | 1 | Indicates whether BCC or LDPC is used: Set to 0 to indicate BCC Set to 1 to indicate LDPC |

TABLE 11

| Two Parts of HE-SIG-A | Bit | Field | Number of bits | Description |
|---|---|---|---|---|
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0 |
| | B9 | STBC | 1 | If the DCM field is set to 0, then set to 1 if space time block coding is used. Neither DCM nor STBC shall be applied if both the DCM field and STBC field are set to 1. Set to 0 otherwise. |
| | B10 | Beam-formed(#16038) | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (sec 28.3.11.16 Midamble), the midamble is not present, but the channel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 12

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. NOTE-The TDLS peer can identify the TDLS frame by To DS and From DS fields in the MAC header of the MPDU. |
| | B1-B3 | SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4. |

TABLE 12-continued

| Two Parts of HE-SIG-A | Bit | Field | Number of bits | Description |
|---|---|---|---|---|
| | B5-B10 | BSS Color | 6 | The BSS Color field is an identifier of the BSS. Set to the value of the TXVECTOR parameter BSS__-COLOR. |
| | B11-B14 | Spatial Reuse | 4 | Indicates whether or not spatial reuse is allowed during the transmission of this PPDU Set to the value of the SPATIAL__REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL__REUSE)). Set to SRP__DISALLOW to prohibit SRP-based spatial reuse during this PPDU. Set to SRP__AND__NON__SRG__OBSS__PD__PROHIBITED to prohibit both SRP-based spatial reuse and non-SRG OBSS PD-based spatial reuse during this PPDU. For the interpretation of other values see 27.11.6 (SPATIAL__REUSE) and 27.9 (Spatial reuse operation). |

20

TABLE 13

| Two Parts of HE-SIG-A | Bit | Field | Number of bits | Description |
|---|---|---|---|---|
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz sub-channels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 |
| | B22 | SIGB Compression | 1 | Set to 0 if the Common field in HE-SIG-B is present. Set to 1 if the Common field in HE-SIG-B is not present. |

TABLE 14

| Two Parts of HE-SIG-A | Bit | Field | Number of bits | Description |
|---|---|---|---|---|
| | B23-B24 | GI + LTF Size | 2 | Indicates the GI duration and HE-LTF size:<br>Set to 0 to indicate a 4x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate a 4x HE-LTF and 3.2 μs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)<br>Otherwise, B0 is set to 1 and B1-B6 is set to floor ((TXOP_DURATION − 512)/128)<br>where<br>B0 indicates the TXOP length granularity. Set to 0 for 8 μs; otherwise set to 1 for 128 μs.<br>B1-B6 indicates the scaled value of the TXOP_DURATION |
| | B7 | Reserved | 1 | Reserved and set to 1 |

TABLE 15

| Two Parts of HE-SIG-A | Bit | Field | Number of bits | Description |
|---|---|---|---|---|
| | B8-B10 | Number of HE-LTF Symbols And Midamble Periodicity | 3 | If the Doppler field is set to 0, indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1 B8-B9 indicates the number of HE-LTF symbols and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1 |

TABLE 15-continued

| Two Parts of HE-SIG-A | Bit | Field | Number of bits | Description |
|---|---|---|---|---|
| | | | | Set to 2 to indicate a pre-FEC padding factor of 2 |
| | | | | Set to 3 to indicate a pre-FEC padding factor of 3 |
| | B15 | PE Disambiguity | 1 | Indicates PE disambiguity as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

15

In addition, the HE-SIG-A field of the HE TB PPDU may be defined as follows.

TABLE 16

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_-COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 17

| Two Parts of HE-SIG-A | Bit | Field | Number of bits | Description |
|---|---|---|---|---|
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. |

TABLE 17-continued

| Two Parts of HE-SIG-A | Bit | Field | Number of bits | Description |
|---|---|---|---|---|
| | | | | If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR. which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROIHBITED to prohibit both SRP- based spatial reuse and non-SRG OBSS PD-based spatial reuse during this PPDU. For the interpretation of other values see 27.11.6 (SPATIAL_REUSE) and 27.9 (Spatial reuse operation). |

TABLE 18

| Two Parts of HE-SIG-A | Bit | Field | Number of bits | Description |
|---|---|---|---|---|
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP- based spatial reuse and non-SRG OBSS PD-based spatial reuse during this PPDU. For the interpretation of other values see 27.11.6 (SPATIAL_REUSE) and 27.9 (Spatial reuse operation). |

TABLE 19

| Two Parts of HE-SIG-A | Bit | Field | Number of bits | Description |
|---|---|---|---|---|
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If the STA operating channel width is 20 MHz, then this field is set to the same value as Spatial |

TABLE 19-continued

| Two Parts of HE-SIG-A | Bit | Field | Number of bits | Description |
|---|---|---|---|---|
| | | | | Reuse 1 field. |
| | | | | If the STA operating channel width is 40 MHz, then this field is set to the same value as Spatial Reuse 2 field. |
| | | | | If the Bandwidth field indicates 160/80 + 80 MHz: This Spatial Reuse field applies to the fourth 40 MHz subband of the 160 MHz operating band. |
| | | | | If the STA operating channel width is 80 + 80 MHz, then this field is set to same value as Spatial Reuse 2 field. |
| | | | | Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz Set to 1 for 40 MHz Set to 2 for 80 MHz Set to 3 for 160 MHz and 80 + 80 MHz |

TABLE 20

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION − 512)/128) where B0 indicates the TXOP length granularity. Set to 0 for 8 μs; otherwise set to 1 for 128 μs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

The HE-SIG-B 2040 may be included only for a multiple-user (MU) PPDU as described above. Basically, the HE-SIG-A 2050 or the HE-SIG-B 2060 may include resource allocation information (or virtual resource allocation information) for at least one receiving STA.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel That is, the STA may transmit a signal (PPDU) through a 40 MHz channel (that is, a 40 MHz bonding channel) including a P20 channel and the S20 channel.

Figure 21:
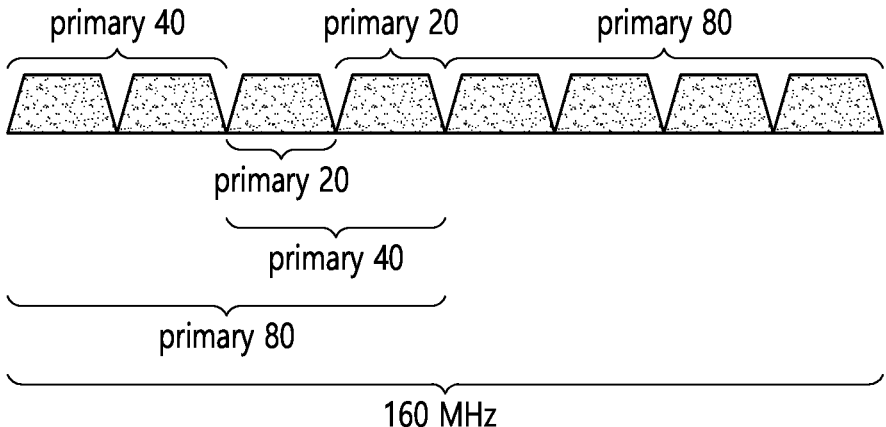
FIG. 21 illustrates an example of channel bonding.

FIG. 21 illustrates an example of channel bonding. As shown in FIG. 20, the primary 20 MHz channel and the secondary 20 MHz channel may configure a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the primary 20 MHz channel, the secondary 20 MHz channel, the secondary 40 MHz channel, and the secondary 80 MHz channel may be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by an STA in the present disclosure will be described.

For example, in the example of FIG. 20, if the primary 20 MHz channel, the secondary 40 MHz channel, and the secondary 80 MHz channel are all in the idle state, but the secondary 20 MHz channel is in the busy state, bonding to the secondary 40 MHz channel and the secondary 80 MHz channel may not be possible. In this case, the STA may configure a 160 MHz PPDU and may perform a preamble puncturing on a preamble (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.) transmitted through the secondary 20 MHz channel, so that the STA may transmit a signal through a channel in the idle state. In other words, the STA may perform preamble puncturing for some bands of the PPDU. Information related to the preamble puncturing (for example, information related to 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by an STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one a management frame, a control frame, and a data frame.

When one STA supports a plurality of links, a transceiver supporting each link may operate as one logical STA. For example, one STA supporting two links could be expressed as one multi-link device (MLD) including a first STA for a first link and a second STA for a second link. For example, one AP supporting two links could be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (the AP MLD and/or the non-AP MLD) may transmit information about a link that the corresponding MLD can support through ML setup. Link information may be configured in various ways. For example, information about the link may include at least one of 1) information related to whether the MLD (or STA) supports simultaneous RX/TX operation, 2) information related to the number/ upper limit of uplink/downlink links supported by the MLD (or STA), 3) information about the location/band/resource of the uplink/downlink link supported by the MLD (or STA), 4) information related to available or preferred frame types (management, control, data, etc.) in at least one uplink/ downlink link, 5) ACK policy information available or preferred in at least one uplink/downlink link, and 6) information related to available or preferred traffic identifier (TID) in at least one uplink/downlink link. The TID is related to the priority of traffic data and is expressed as eight types of values according to the conventional wireless LAN standard. That is, eight TID values corresponding to four access categories (AC) (AC_BK (background), AC_BE (best effort), AC_VI (video), AC_VO (voice)) according to the conventional WLAN standard may be defined.

For example, it may be pre-configured in advance that all TIDs are mapped for uplink/downlink link. Specifically, when negotiation is not made through ML setup, all TIDs are used for ML communication. If the mapping between the uplink/downlink link and the TID is negotiated through additional ML settings, the negotiated TID may be used for ML communication.

A plurality of links usable by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information related to the new link may be transmitted based on at least one a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs an STA function, it may be referred to as a non-AP MLD.

According to an embodiment, in the EHT standard (i.e., 802.11be), a multi-link may be classified into primary/secondary links to reduce power consumption. An AP supporting the multi-link may manage each link by designating the link as the primary link or the secondary link. The AP may designate one or more links among several links as the primary link. Links other than the primary link may operate as the secondary link. The primary link may be called variously. For example, the primary link may be called an anchor link. In addition, the secondary link may also be called variously. For example, the secondary link may be called a non-anchor link.

According to an embodiment, the primary link may mean a link that performs all functions of the link. In addition, the secondary link may mean a link that performs a limited function (for example, data frame exchange) for power-saving.

According to an embodiment, in the EHT standard, a multi-link may be divided into a general/power-saving link. The above-described primary link may correspond to a general link. In other words, the above-described primary link may be related to a general link. In addition, the above-described secondary link may correspond to a power-saving link. In other words, the above-described secondary link may be related to a power-saving link.

For example, the primary link may be used not only for frame exchange for synchronization but also for non-data frame exchange (that is, Control/Management frame exchange). The secondary link can only be used for data frame exchange.

Therefore, the STA can listen only to the primary link for receiving the Beacon and/or Control/Management frame during the idle time (or period). In other words, the STA may operate only in the primary link for receiving the Beacon and/or Control/Management frame during the idle time (or period). Therefore, a non-AP Multi-Link Device (MLD) must be connected to at least one primary link.

In the following specification, MLD may refer to a multi-link device. The MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, the AP MLD or the non-AP MLD may be configured in a structure having a plurality of links. In other words, the non-AP MLD may support the plurality of links. The non-AP MLD may include a plurality of STAs. The plurality of STAs may have a link for each STA.

For example, the non-AP MLD may include an STA 1, an STA 2, and an STA 3. The STA 1 may operate in a link 1. The link 1 may be included in a 5 GHz band. The STA 2 may operate in a link 2. The link 2 may be included in a 6 GHz band. The STA 3 may operate in a link 3. The link 3 may be included in the 5 GHz band. The band included in the link 1/2/3 is for exemplary purposes, and may be included in the 2.4, 5, and 6 GHz bands.

In the EHT standard (802.11be standard), a multi-link device (MLD) structure in which one AP/non-AP MLD supports several links is considered as a main technology. An STA included in the non-AP MLD may transfer information related to another STA in the non-AP MLD together through one link. Therefore, there is an advantage in that an overhead of frame exchange is reduced. In addition, there is an advantage in that link usage efficiency of the STA is increased, and the use of power consumption is decreased.

In the following specification, various embodiments may be described for applying an opportunistic power save (OPS) mechanism in a multi-link. First, an operation of the OPS mechanism may be described below without consideration of the multi-link.

In the 802.11ax standard (i.e., the HE standard), a mechanism (or OPS mode) for scheduling whether a plurality of STAs connected to an AP is in a doze state is defined for power management of a non-AP STA. Hereinafter, a specific example of the operation of the OPS mechanism may be described. For convenience of description, an AP/STA supporting the OPS mechanism may be referred to as an OPS AP/OPS non-AP STA, respectively.

The OPS mechanism is a mechanism which allows OPS non-AP STAs to change to an unavailable state or a doze state for power saving during a defined period. The OPS mechanism may support two modes, i.e., an unscheduled mode and a scheduled mode.

For example, the unscheduled mode is a mode in which the OPS AP may transmit an OPS frame (or FILS discovery frame) which provides scheduling information to all OPS non-AP STAs at any time. When in an active mode, the OPS non-AP STAs may operate in the unavailable state during the OPS duration, based on the scheduling information. When in a power save (PS) mode, the OPS non-AP STAs may operate in the doze state during the OPS duration, based on the scheduling information.

As an example, the OPS non-AP STA may receive an OPS frame including scheduling information while operating in the active mode. The OPS non-AP STA may change a state of the OPS non-AP STA to the unavailable state, based on the OPS frame.

As another example, the OPS non-AP STA may receive the OPS frame including scheduling information while operating in the PS mode. The OPS non-AP STA may change the state of the OPS non-AP STA from the awake state to the doze state, based on the OPS frame.

As another example, in the scheduled mode, the OPS AP may divide one beacon interval into several periodic broadcast TWT service periods (SPs). The OPS AP may provide the scheduling information to all OPS non-AP STAs at each SP start time. Based on the scheduling information, the OPS non-AP STAs may operate in the unavailable state when in the active mode, and may operate in in the doze state when in the PS mode, until a next TWT SP.

As an example, the OPS non-AP STA operating in the active mode may receive an OPS frame in the TWT SP. Based on the OPS frame, the OPS non-AP STA may change the state of the OPS non-AP STA to the unavailable state.

As an example, the OPS non-AP STA operating in the PS mode may receive the OPS frame in the TWT SP. Based on the OPS frame, the OPS non-AP STA may change the state of the OPS non-AP STA from the awake state to the doze state.

According to an embodiment, frames and elements related to the OPS mechanism may be configured/set/defined as follows.

For example, the OPS frame may include information of Table 21.

TABLE 21

| Order | Information |
| --- | --- |
| 1 | Category |
| 2 | HE Action |
| 3 | TIM element |
| 4 | OPS element |

Referring to Table 21, the OPS frame may include Category, HE Action, TIM element, and/or OPS element. The OPS frame may be configured in sequence (or order) as shown in Table 21. In particular, the TIM element and the OPS element may always be included in the OPS frame.

Hereinafter, a specific example of the TIM element and the OPS element may be described.

Figure 22:
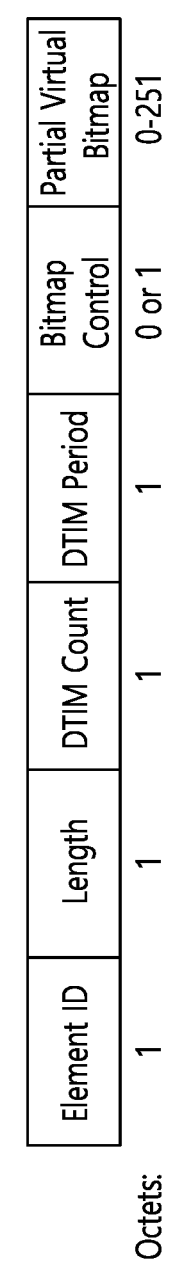
FIG. 22 illustrates a specific example of a TIM element.

FIG. 22 illustrates a specific example of the TIM element.

Referring to FIG. 22, a TIM element 2200 may include element ID, Length, delivery traffic indication map (DTIM) count, DTIM period, Bitmap Control, and/or Partial Virtual Bitmap.

According to an embodiment, for an unscheduled OPS mechanism, the TIM element 2200 may be included in an OPS frame or a FILS discovery frame. For example, the OPS frame or the FILS discovery frame may be transmitted from an OPS AP. In this case, a TIM element which is set differently from the TIM element 2200 shown in FIG. 22 may be configured/set. The TIM element included in the OPS frame or FILS discovery frame for the unscheduled OPS mechanism may be configured/set as follows.

For example, the DTIM count field may be changed to "reserved".

For example, the DTIM count field may be changed to "reserved".

For example, a bit 'N' of the traffic indication virtual bitmap corresponding to an OPS non-AP STA with AID 'N' may be determined/set in various ways. For example, the traffic indication virtual bitmap may be related to the AID of the OPS non-AP STA. As an example, information for the OPS non-AP STA with AID 'N' may be indicated through an N-th bit (or bit N) of the traffic indication virtual bitmap. If the OPS AP has no plan to transmit a frame (including a trigger frame for UL MU transmission) to the OPS non-AP STA during an OPS period duration, the bit N may be set to 0. If the OPS AP has a plan to transmit a frame to the OPS non-AP STA during the OPS period duration, the bit N may be set to 1.

For example, the bit "N" of the traffic indication virtual bitmap corresponding to the Non-OPS non-AP STA with AID 'N' may be determined/set in various ways. For example, if the AP has a buffered frame for the STA, the bit N may be set to 1. If the AP does not have the buffered frame for the STA, the bit N may be set to 0.

According to an embodiment, for a scheduled OPS mechanism, the TIM element may be included in the OPS frame or the FILS discovery frame. For example, the OPS frame or the FILS discovery frame may be transmitted from an OPS AP. In this case, a TIM element which is set differently from the TIM element 2200 shown in FIG. 22 may be configured/set. The TIM element included in the OPS frame or FILS discovery frame for the scheduled OPS mechanism may be configured/set as follows.

For example, the DTIM count field may be changed to "reserved".

For example, the DTIM count field may be changed to "reserved".

For example, a bit 'N' of the traffic indication virtual bitmap corresponding to an OPS non-AP STA with AID 'N' may be determined/set in various ways. For example, the traffic indication virtual bitmap may be related to the AID of the OPS non-AP STA. As an example, information for the OPS non-AP STA with AID 'N' may be indicated through an N-th bit of the traffic indication virtual bitmap. If the OPS AP has no plan to transmit a frame information trigger information (or a trigger frame) for UL MU transmission to the OPS non-AP STA before a next TWT SP or during a TWT SP, the bit N may be set to 0. Otherwise, the bit N may be set to 1.

For example, the bit "N" of the traffic indication virtual bitmap corresponding to the Non-OPS non-AP STA with AID 'N' may be determined/set in various ways. As an example, if the AP has a buffered frame for the STA, the bit N may be set to 1. If the AP does not have the buffered frame for the STA, the bit N may be set to 0.

Figure 23:
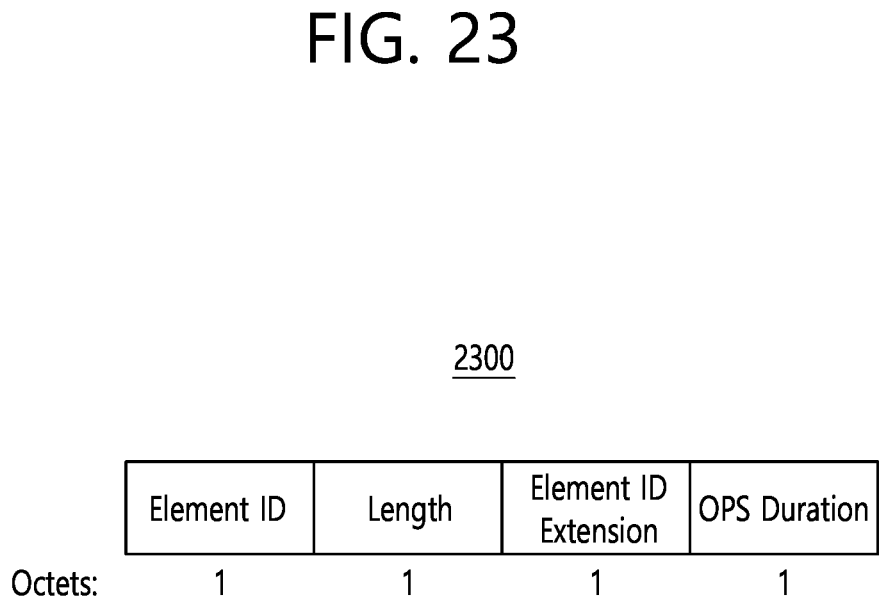

FIG. 23 illustrates a specific example of the OPS element.

Referring to FIG. 23, an OPS element 2300 may include element ID, Length, Element ID Extension, and/or OPS Duration.

According to an embodiment, the OPS element 2300 may be included in an OPS frame or a FILS discovery frame. The OPS duration field may include information related to an OPS period duration in which an STA may enter a doze state. However, an OPS operation may be allowed only when the STA is not externally scheduled during the OPS period. The OPS duration may be encoded in units of milliseconds.

The aforementioned OPS frame (or OPS mechanism) cannot support a multi-link supported in the EHT standard. Therefore, an OPS frame (or OPS mechanism) considering a multi-link AP/non-AP MLD characteristic supported in the EHT standard may be proposed in the specification described below.

In the OPS mechanism, a presence/absence of transmission data or buffer data for each STA may be indicated/transmitted through the TIM element. In case of the conventional non-AP STA supporting a single link, only information related to whether data to be transmitted to the non-AP STA is present from a perspective of the AP may be included in the TIM element.

Unlike this, in case of the non-AP MLD supporting the multi-link, buffer data may be generated in each of at least one STA included in the non-AP MLD. Therefore, the OPS frame or TIM frame transmitted to the OPS non-AP MLD supporting OPS may need to indicate information related to a presence/absence of transmission data or buffer data for each STA included in the OPS non-AP MLD. In other words, the OPS AP MLD needs to transmit the information related to the presence/absence of the transmission data or buffer data for each STA included in the OPS non-AP MLD, through the OPS frame or the TIM frame.

In addition, in the EHT standard, a plurality of links supported by the AP/non-AP MLD may be classified into an anchored link (or primary link) or a non-anchored link (or secondary link), based on characteristics.

Figure 24:
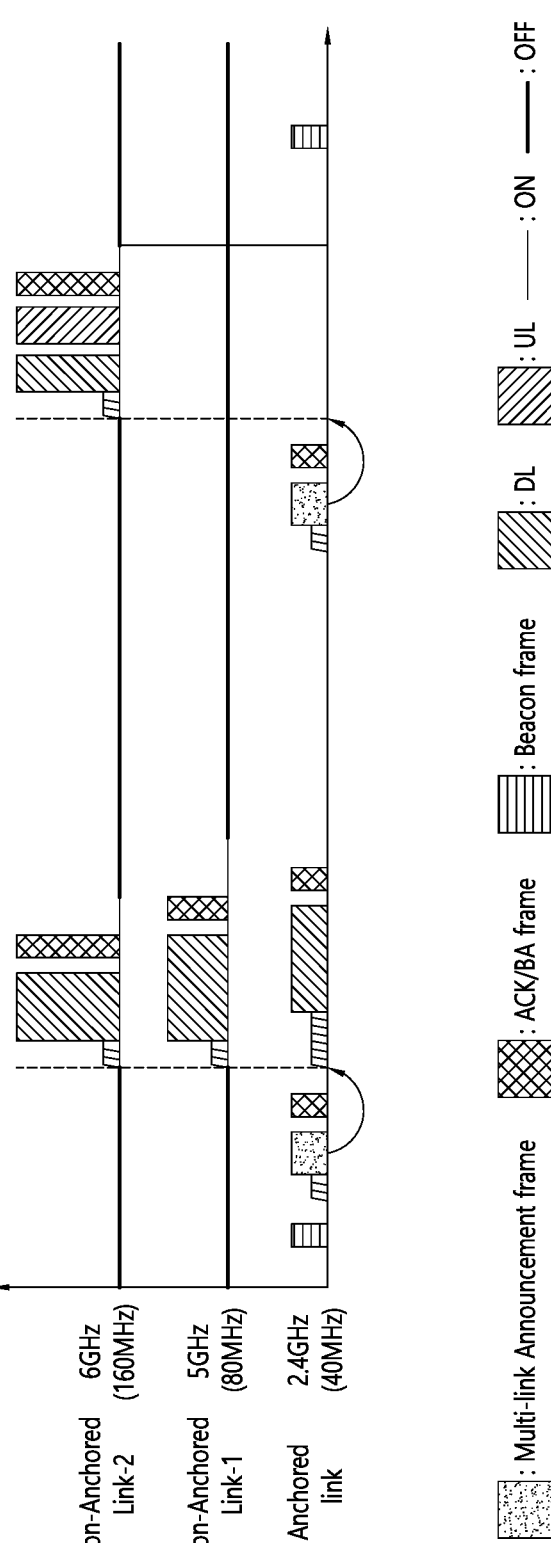
FIG. 24 illustrates an example of an operation of an anchored link and non-anchored link in a multi-link.

FIG. 24 illustrates an example of an operation of an anchored link and non-anchored link in a multi-link.

Referring to FIG. 24, a non-AP MLD may perform management/control frame (e.g., beacon frame) exchange and frame exchange for synchronization only through an anchored link. Therefore, the STA connected through the anchored link shall always maintain an enable state. For example, even when a power save mode is supported, the STA connected through the anchored link shall enter an awake state according to target beacon transmission time (TBTT) to receive a beam frame.

Accordingly, an operation of the anchored link may require a relatively large load and a lot of power compared to the non-anchored link. Otherwise, a non-anchored link in which data frame exchange does not occur may enter an unavailable state (disable or doze state). Therefore, power consumption in the non-anchored link may be reduced.

Accordingly, the specification described below may propose a technical feature for providing whether the STA enters during the OPS duration or for providing another OPS duration value may be proposed, based on a characteristic/situation for each link. A structure of an OPS element and TIM element used in the OPS mechanism operation may be newly proposed/changed, based on the aforementioned embodiments.

First Embodiment

In a first embodiment, when an OPS frame or a TIM frame is transmitted to a non-AP MLD, a TIM element considering a multi-link may be proposed to indicate a presence/absence of transmission data or buffer data for each STA included in the non-AP MLD.

According to an embodiment, the TIM element may further include link ID information. Hereinafter, two embodiments in which the link ID information is included in the TIM element may be described. The embodiment described hereinafter is for exemplary purposes only, and may change variously. In addition, a specific field name may be set variously.

1) When Bitmap Information is Configured for Each Link ID

A TIM element may include bitmap information for each link ID. A specific example for this may be described with reference to FIG. 25.

Figure 25:
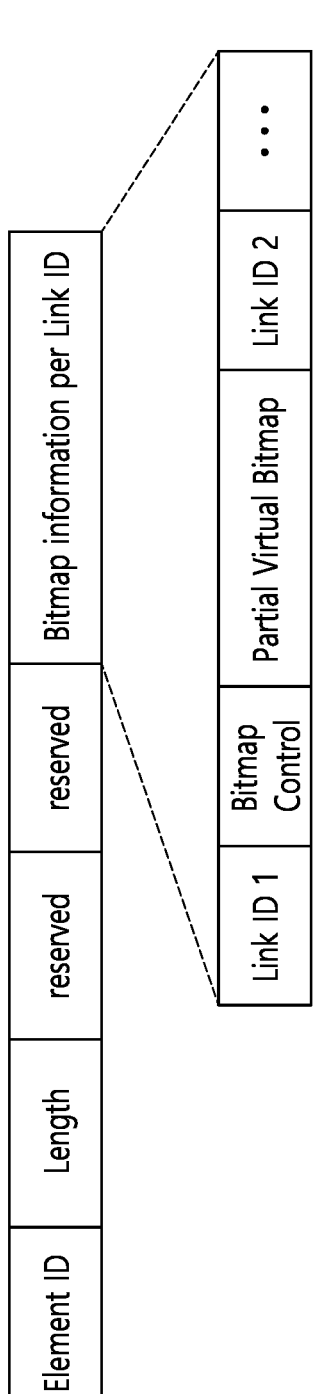
FIG. 25 illustrates a specific example of a TIM element.

FIG. 25 illustrates a specific example of the TIM element.

Referring to FIG. 25, the TIM element may include a bitmap control field and partial virtual bitmap field for each link ID. That is, an STA which has received this field (e.g., an STA included in a non-AP MLD) may identify a presence/absence of transmission data or buffer data transmitted to the STA, based on link ID information of a link to which the STA is connected.

For example, a first STA included in the non-AP MLD may be coupled to an AP MLD through a link 1 and a link 2. The first STA may identify a bitmap control field and partial virtual bitmap field for each link ID, based on the TIM element. The first STA may identify a bitmap control field and partial virtual bitmap field for the link 1 (or a link ID 1). In addition, the first STA may identify a bitmap control field and partial virtual bitmap field for a link 2 (or a link ID 2). Therefore, the first STA may identify a presence/absence of buffered data in each of the link 1 and the link 2.

2) When Bitmap Information for all Links is Configured

The TIM element may include bitmap information for all links. A specific example for this may be described with reference to FIG. 26.

Figure 26:
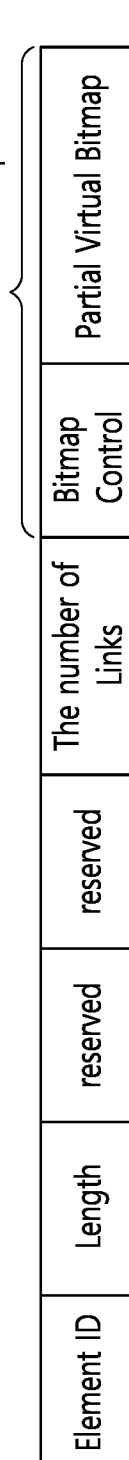
FIG. 26 illustrates a specific example of a TIM element.

FIG. 26 illustrates a specific example of the TIM element.

Referring to FIG. 26, the TIM element may include 'the number of links' field including information related to the number of links provided by a current AP MLD. In addition, in a bitmap control field and a partial virtual bitmap field, information related to STAs of all links provided by the AP MLD may be indicated using a bitmap. An STA which has received the TIM element may identify a bitmap order of links to which the STA is connected, based on the 'the number of links' field. Therefore, the STA may identify a presence/absence of transmission data or buffer data transmitted to the STA.

Second Embodiment

In a second embodiment, an OPS element for providing various OPS durations for each link may be provided.

One specified OPS duration has been conventionally used to schedule an OPS non-AP STA. According to the second embodiment, in case of a non-AP MLD, the OPS duration may be set differently, based on a characteristic of each link (e.g., an anchored link, BSS load, etc.).

For example, unlike in STAs connected to a non-anchored link, an OPS duration which is different from that of the STAs connected to the non-anchored link may be set in STAs connected to the anchored link, in order to receive a management frame (e.g., beacon).

As an example, an STA 1 of the non-AP MLD may be connected to the anchored link, and an STA 2 and an STA 3 may be connected to the non-anchored link. In this case, in order to receive a beam frame transmitted periodically to the STA 1 connected to the anchored link, a short OPS duration may be set by considering a TBTT. That is, the OPS duration which is set in the STA connected to the anchored link may be set to be shorter than an OPS duration which is set in the STA connected to the non-anchored link.

An example of an OPS element for the aforementioned embodiment may be described with reference to FIG. 27 and FIG. 28.

Figure 27:
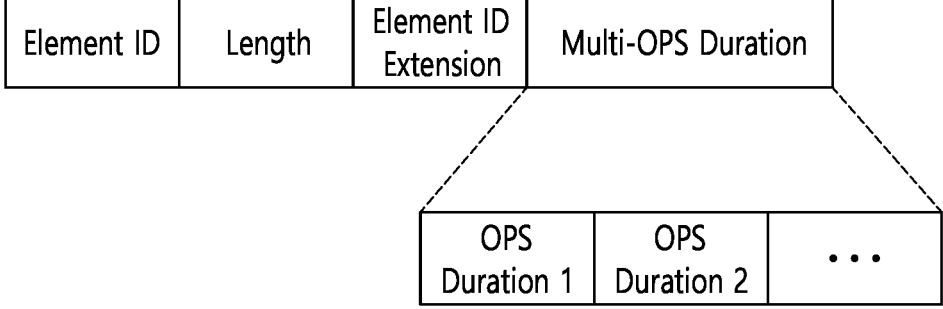
FIG. 27 illustrates a specific example of an OPS element.

FIG. 27 illustrates a specific example of the OPS element.

Referring to FIG. 27, an OPS duration may be set differently, based on various situations/characteristics. Therefore, the OPS element may include information related to the OPS duration which is set differently (e.g., an OPS duration 1 or an OPS duration 2).

For example, the OPS element may be set such that the OPS duration is different, based on whether it is an anchored link. As an example, the OPS duration 1 may include information related to an OPS duration applied in the anchored link. The OPS duration 2 may include information related to an OPS duration applied in the non-anchored link.

That is, an AP MLD may provide/configure a non-AP MLD with an OPS duration which is different for each specific link through one frame (or OPS element).

Figure 28:
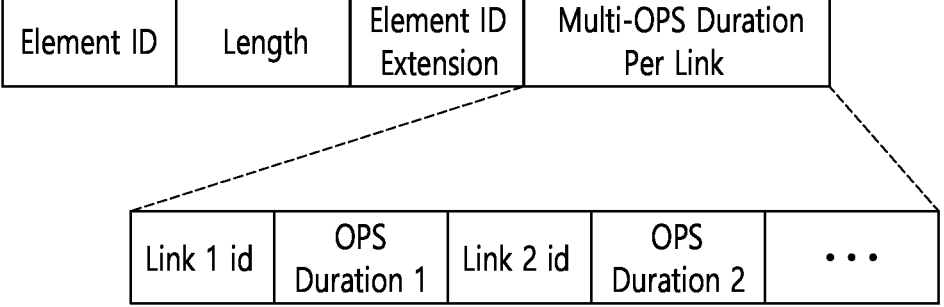
FIG. 28 illustrates a specific example of an OPS element.

FIG. 28 illustrates a specific example of the OPS element.

Referring to FIG. 28, an AP MLD may provide an OPS duration which is different for each link ID through the OPS element. That is, a different OPS duration may be set according to a link id. A 'multi-OP duration per link' field may indicate a different OPS duration value for each link, based on the link id and the OPS duration. That is, the AP MLD may set the OPS duration to be different based on the link ID, and may transmit information thereto to the non-AP MLD.

For example, in case of a link to which the OPS duration is not applied, an OPS duration value may be set to 0. When the OPS duration value is 0, since an additional OPS operation is not performed, a subfield for a corresponding link id value and corresponding OPS duration may be omitted.

Third Embodiment

In a third embodiment, an OPS element may be proposed so that an OPS AP/non-AP MLD provides various OPS durations. According to the third embodiment, an AP MLD may configure a link or STAs connected to the link into various group sets depending on various link characteristics (e.g., a per-link BSS load, etc.) and may identify each of the STAs. The AP MLD may provide a different OPS duration depending on each group set.

Hereinafter, a group identifier element or field may be proposed for the aforementioned embodiment. A field included in the group identifier element or field may be configured/set as follows.

Group Identifier: Group id

Group ID indication: information indicating whether it belongs to an STA according to a group id. For example, an AP MLD may indicate an STA belonging to each group by using one bitmap. The group ID indication may be set to 1 when the STA belongs to a corresponding group, and may be set to 0 when the STA does not belong to the corresponding group.

For example, a per-bit STA indication order of the group id indication may be set to the same bitmap order as a bit order of a traffic indication virtual bitmap corresponding to an AID of a non-AP STA. In other words, in the traffic indication virtual bitmap, whether an STA corresponding to an 'n-th' bit belongs to a group may also be indicated by an 'n-th' bit in the group ID indication.

An example of an OPS element according to the aforementioned embodiment may be described with reference to FIG. 29 and FIG. 30.

Figure 29:
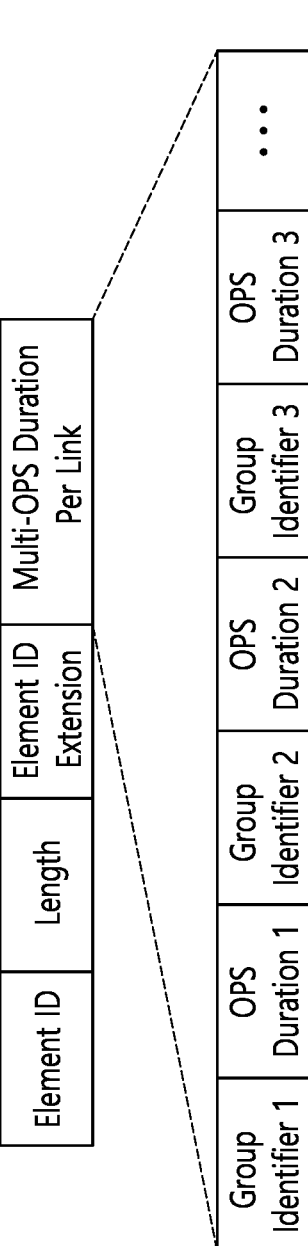
FIG. 29 illustrates a specific example of an OPS element.

FIG. 29 illustrates a specific example of the OPS element.

Referring to FIG. 29, when OPS non-AP STAs know whether they belong to respective group IDs, the OPS non-AP STAs may identify a group only by using a group id in a 'multi-OPS duration field per group' as shown in FIG. 29. Therefore, an AP MLD (or OPS AP MLD) may provide various OPS durations depending on the group. In other words, the OPS element may include a group id. An STA included in the OPS non-AP MLD may identify an OPS duration depending on the group.

Figure 30:
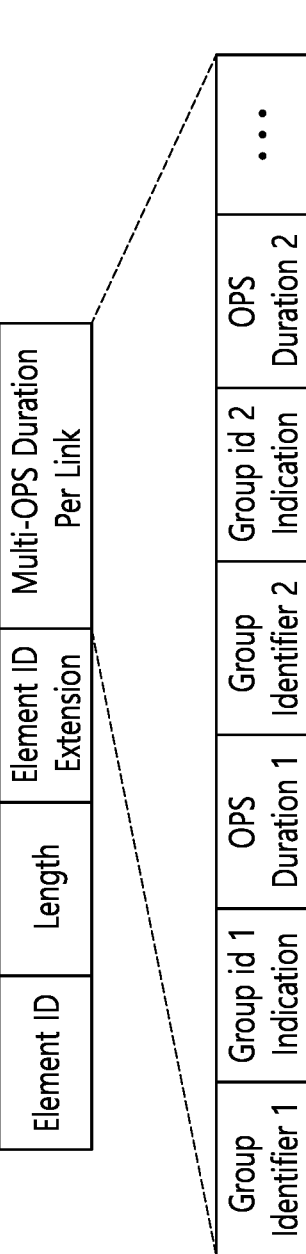
FIG. 30 illustrates a specific example of an OPS element.

FIG. 30 illustrates a specific example of the OPS element.

Referring to FIG. 30, when there is no information related to a previously given group ID and group set, in order for an STA included in an OPS non-AP MLD to determine this, whether an STA belongs to each group id may be indicated based on a group id and group indication bitmap. In other words, the OPS element may include the group id and the group indication (or group id indication). Based on the group id and the group indication (or group id indication) included in the OPS non-AP MLD, the STA included in the OPS non-AP MLD may identify a group of the STA, and may identify an OPS duration depending on the group.

Referring to FIG. 29 and FIG. 30, the STA included in the OPS non-AP MLD which has received the OPS element may perform an OPS operation according to an OPS duration corresponding to a group to which the STA belongs. If the OPS duration value is set to 0, a corresponding group identifier and group id indication subfield may be omitted to reduce an overhead.

Fourth Embodiment

According to a fourth embodiment, in a case where an OPS AP/non-AP MLD supports an anchored link, when an OPS mechanism operates, information related to the anchored link may be transmitted by being included in an OPS frame or a TIM frame.

An anchored link list element (or field) and an anchored link indication element (or field) may be configured/set/ defined as follows for the aforementioned embodiment.

Anchored Link List element: A list of links currently supported by an AP MLD. For example, the list of links currently supported by the anchored link may be indicated through a link identifier (e.g., link ID, AP BSS value, etc.). As another example, a presence/absence of an anchored link may be sequentially indicated for each link through one bitmap. Though this information, a non-AP MLD may identify information of all anchored links supported by the AP MLD.

Anchored Link indication element: Information indicating whether an anchored link is preset in practice for each STA. For example, an STA of a non-AP MLD may select one or more links from a list of several anchored links (e.g., anchored link list elements) provided by the AP MLD and may use the selected link as an anchored list. Therefore, anchored link list information of an AP MLD may be different from information related to an anchored link selected and used in practice by the STA may be different.

Accordingly, in order to provide different OPS durations to an STA connected by an anchored link and an STA connected by a non-anchored link, an anchored link indication element (or information included in the anchored link indication element) may be used as an identifier for identifying the links. However, when an additional identifier (or subfield) for identifying the anchored/non-anchored link is used in the multi-OP duration field, the anchored link indication element may be omitted.

FIG. 31 illustrates a specific example of the anchored link indication field (element).

Referring to FIG. 31, the anchored link indication field may indicate whether an anchored link is connected for each STA of a non-AP MLD by using one bitmap. In other words, the anchored link indication field may be configured using one bitmap, and may include information related to whether the anchored link is connected for each STA of the non-AP MLD.

For example, in the anchored link indication field configured using the bitmap, each bit may be set to 1 when the STA is connected to the anchored link, and otherwise, may be set to 0. As an example, a per-bit STA indication order of the anchored link indication may be set to the same bitmap order as a bit order of a traffic indication virtual bitmap corresponding to an AID of a non-AP STA. In other words, in the traffic indication virtual bitmap, whether a link connected to an STA corresponding to an 'n-th' bit is an anchored link may also be indicated by an 'n-th' bit in the group ID indication.

According to an embodiment, the information related to the anchored link indication may be included as an anchored link indication element in the existing OPS action frame configuration (e.g., the configuration based on Table 21).

According to an embodiment, the information related to the anchored link indication may be added as an additional field in the OPS element or the TIM element to indicate whether an anchored link is present.

According to an embodiment, the anchored link list element and the anchored link indication element may be included in the OPS frame as individual fields. For example, the OPS AP MLD may instruct the OPS non-AP STAs to perform various OPS operations, based on the OPS frame. In other words, the OPS frame may include the anchored link list element, anchored link indication element, OPS duration, and/or Multi-OPS duration information.

In addition, when receiving an OPS frame, the OPS non-AP STA may identify that the anchored link list field and/or the anchored link indication field may be included in the OPS element. In this case, the OPS non-AP STA may identify that the OPS frame is a frame for providing a different OPS depending on an anchored link characteristic.

According to an embodiment, the OPS element may include the anchored link list and/or anchored link indication field, and information related to one OPS duration may be transmitted through the OPS element. Therefore, OPS non-AP STAs connected to the anchored link may ignore the OPS duration, and only OPS non-AP STAs connected to the non-anchored link may operate based on the OPS duration. An example of the OPS element according to the embodiment may be described with reference to FIG. 32.

Figure 32:
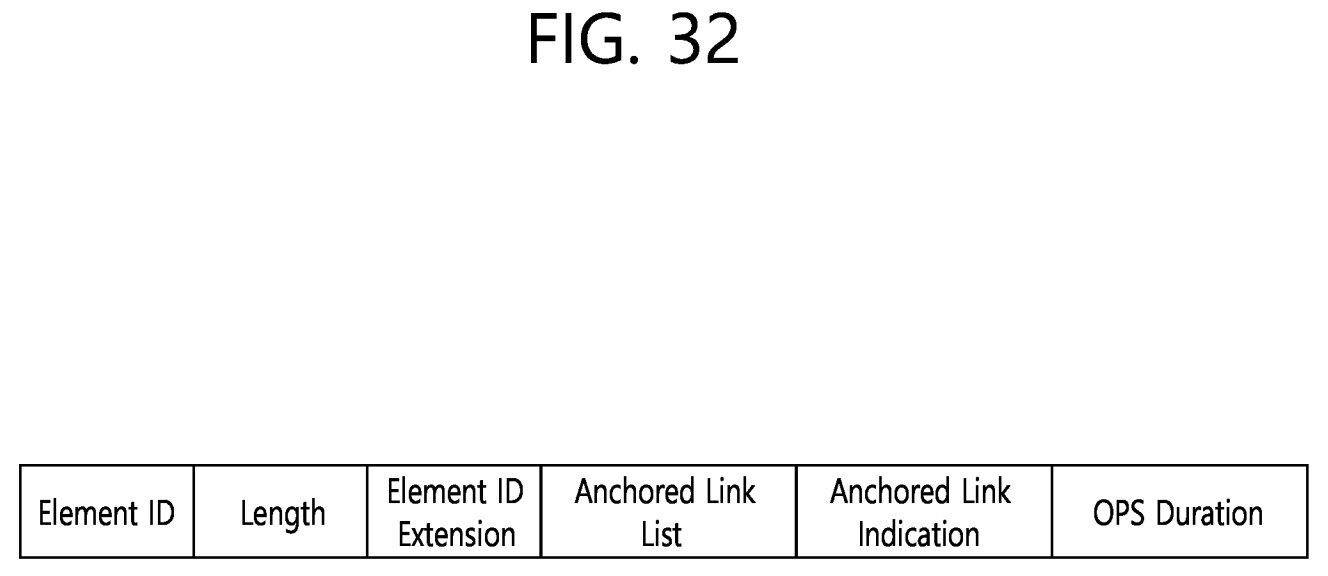

FIG. 32 illustrates a specific example of the OPS element.

Referring to FIG. 32, the OPS element may include Element ID, Length, Element ID Extension, Anchored Link List, Anchored Link Indication, and/or OPS Duration.

An OPS non-AP STA which has received the OPS element may obtain information related to the OPS duration, based on Anchored Link List (or Anchored Link List information/field) and Anchored Link Indication (or Anchored Link Indication information/field).

For example, OPS non-AP STAs in which a value of anchored link indication is indicated/set to 1 may be STAs connected to a link operating as an anchored link. Therefore, the OPS non-AP STAs may ignore the OPS duration.

As another example, OPS non-AP STAs in which a value of anchored link indication is indicated/set to 0 may be STAs connected to a link operating as a non-anchored link. Therefore, the OPS non-AP STAs may operate, based on the OPS duration. The OPS non-AP STAs may enter a doze state during a provided OPS duration.

In the aforementioned examples, if the non-AP STAs already know whether they are connected to an anchored link or a non-anchored link, the non-AP STAs may determine whether to operate for the OPS duration only with the anchored link list field.

According to an embodiment, the OPS element may include the anchored link list or anchored link indication field, and information related to two OPS durations may be transmitted through the OPS element.

Therefore, OPS non-AP STAs connected to the anchored link may operate based on an OPS duration 1, and OPS non-AP STAs connected to the non-anchored link may operate based on an OPS duration 2. On the contrary, the OPS non-AP STAs connected to the anchored link may operate based on the OPS duration 2, and the OPS non-AP STAs connected to the non-anchored link may operate based on the OPS duration 1. That is, which duration will be used in the operation among the OPS durations may be changed according to an additional instruction, specification, or implementation. An example of the OPS element according to the embodiment may be described with reference to FIG. 33.

Figure 33:
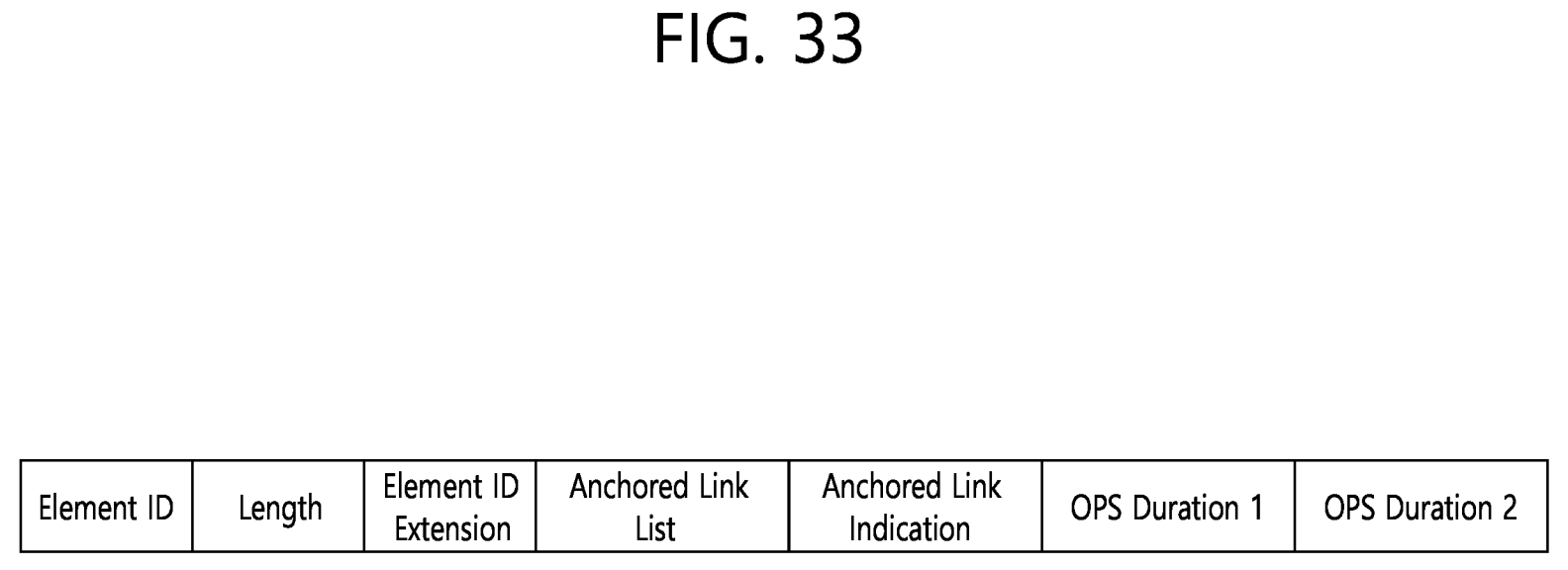

FIG. 33 illustrates a specific example of the OPS element.

Referring to FIG. 33, the OPS element may include Element ID, Length, Element ID Extension, Anchored Link List, Anchored Link Indication, OPS Duration 1, and/or OPS Duration 2. For example, STAs included in an OPS non-AP MLD may identify whether a link connected to the STAs is an anchored link, based on the Anchored Link List and Anchored Link Indication. In addition, the STAs included in the OPS non-AP MLD may identify/obtain OPS Duration, based on whether a link connected to the STAs is an anchored link. As an example, information related to the OPS duration applied to the anchored link may be included in the OPS duration 1. Information related to the OPS duration applied to the non-anchored link may be included in the OPS duration 2.

Fifth Embodiment

According to an embodiment, a plurality of anchored links or non-anchored links may be classified into a plurality of groups. Various OPS durations may be provided/set to each of the plurality of groups. For the aforementioned embodiment, a method (or the third embodiment) for providing a different OPS duration depending on a proposed group set may be applied.

For example, an anchored link list (or anchored link list information/field) or an anchored link indication (anchored link indication information/field) may be included in the OPS element. In addition, similarly to FIG. 29 and FIG. 30, a multi-OPS duration field may include a group id and a group indication (or group id indication).

As an example, when receiving the OPS frame, an OPS non-AP STA may enter a doze state during an OPS duration indicated to the OPS non-AP STA, based on per-group OPS duration information defined therein.

When the OPS element includes an "Anchored Link List" or "Anchored Link indication" field, the OPS non-AP STA may determine that a multi-link is grouped based on an anchored link characteristic. In order to indicate various OPS durations for a plurality of groups in consideration of the anchored link, the OPS element configured as shown in FIG. 34 and FIG. 35 may be used.

FIG. 34 and FIG. 35 illustrate a specific example of the OPS element.

Referring to FIG. 34 and FIG. 35, the OPS element may include a multi-OPS duration field. Various groups may be configured for each anchored link in the multi-IP duration field. The OPS AP MLD may provide a differentiated OPS duration for each group, based on the multi-OPS duration field. Unlike in the embodiment of FIG. 29 and FIG. 30, a group may be identified based on an anchored link in an embodiment of FIG. 34 and FIG. 35. That is, the OPS AP MLD may identify OPS non-AP STAs by using various group sets in relation to an anchored link through various identifiers. Therefore, according to the aforementioned embodiment, there is an advantage in that the OPS AP MLD can provide the differentiated OPS duration value depending on an identified group.

Specifically, referring to FIG. 34, STAs included in the OPS non-AP MLD may receive the OPS element. STAs belonging to a group 1 may mean STAs connected to anchored links, and STAs belonging to the group 1 may operate based on OPS duration information included in the OPS duration 1. STAs belonging to a group 2 may mean STAs connected to non-anchored links, and STAs belonging to the group 2 may operate based on OPS duration information included in the OPS duration 2.

Specifically, referring to FIG. 35, when an AP MLD (or OPS AP MLD) supports a plurality of anchored links, the AP MLD may configure a group set, based on various characteristics of the anchored link. In addition, an identifier (ID) for providing a different OPS duration for each group set may be configured.

For example, first, a multi-link may be classified into an anchored link and a non-anchored link. Thereafter, various group sets may be configured, based on a link state and situation. The various group sets may be identified through a group identifier. The AP MLD may provide a different OPS duration to the OPS non-AP STA. According to an embodiment, when an OPS duration value is set to 0, a corresponding group identifier and group id indication subfield may be omitted to reduce an overhead.

Hereinafter, a specific embodiment in which an AP MLD provides an OPS duration to each of OPS non-AP STAs connected to each link may be described with reference to FIG. 36.

Figure 36:
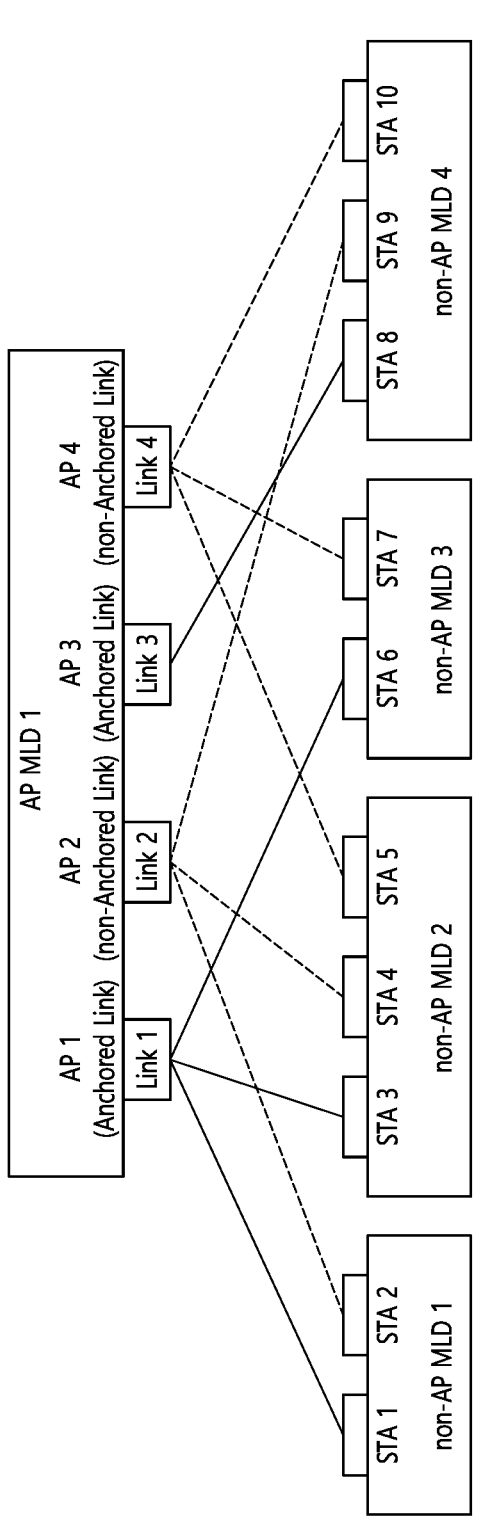
FIG. 36 illustrates an embodiment in which an AP MLD provides an OPS duration to a non-AP MLD.

FIG. 36 illustrates an embodiment in which an AP MLD provides an OPS duration to a non-AP MLD.

Referring to FIG. 36, an AP MLD 1 may provide a different OPS duration to an OPS non-AP STA connected to each link. For example, the AP MLD 1 may operate in four links (link 1 to link 4).

An AP 1 may be connected to an STA 1 of a non-AP MLD 1, an STA 3 of a non-AP MLD 2, and an STA 6 of a non-AP MLD 3 through the link 1. An AP 2 may be connected to an STA 2 of the non-AP MLD 1, an STA 4 of the non-AP MLD 2, and an STA 9 of a non-AP MLD 4 through the link 2. An AP 3 may be connected to an STA 8 of the non-AP MLD 4 through the link 3. An AP 4 may be connected to an STA 5 of the non-AP MLD 2, an STA 7 of the non-AP MLD 3, and an STA 10 of the non-AP MLD 4 through the link 4. In addition, the link 1 and the link 3 may be set as anchored links. The link 2 and the link 4 may be set as non-anchored links.

When the OPS duration is set differently for each link, the AP MLD 1 may provide four OPS durations of 0, 20, 10, and 20 for respective links. That is, an OPS duration value of the link 1 may be set to 0. An OPS duration value of the link 2 may be set to 20. An OPS duration value of the link 3 may be set to 10. An OPS duration value of the link 4 may be set to 20.

Therefore, the STA 1, STA 3, and STA 6 connected to the link 1, which are anchored links, may ignore an OPS operation since an OPS duration is set to 0. The STA 8 connected to the link 3, which is an anchored link, may change a state to an awake state after a doze period of 10.

The STAs 2, 4, 5, 7, 9, and 10 connected to the links 2 and 4, which are non-anchored links, may change a state to an awake state after a doze period of 20.

According to an embodiment, the multi-OPS duration may be roughly classified into two types based on an anchored-link and a non-anchored link and then may be defined/set individually. According to an embodiment, the multi-OPS duration may be defined/set for all links supported by the AP MLD.

Figure 37:
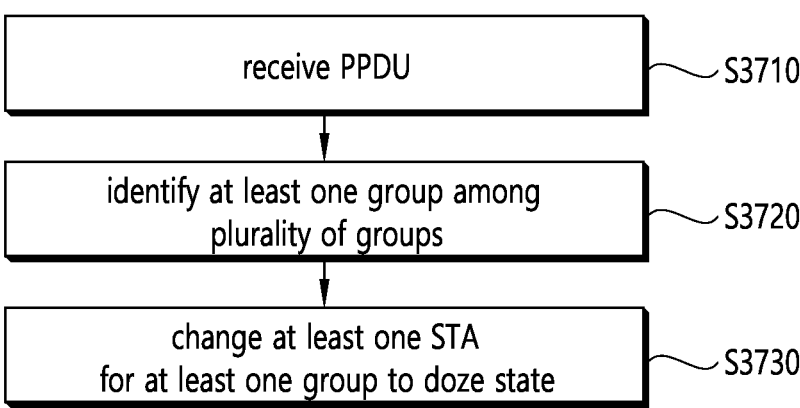
FIG. 37 is a flowchart for describing an operation of an MLD.

FIG. 37 is a flowchart for describing an operation of an MLD.

Referring to FIG. 37, in step S3710, the MLD may receive a PPDU.

According to an embodiment, the MLD may operate in a plurality of links. The MLD may include a plurality of STAs for the plurality of links.

For example, the MLD may include a first STA and a second STA. The first STA may relate to a first link. As an example, the first STA may operate in the first link. In other words, the first STA may be connected to the first link. The second STA may relate to a second link. As an example, the second STA may operate in the second link. In other words, the second STA may be connected to the second link.

For example, the first link may be included in one of 2.4 GHz, 5 GHz, and 6 GHz bands. In addition, the second link may also be included in one of the 2.4 GHz, 5 GHz, and 6 GHz bands.

For example, the first link may be configured in combination of at least one channel included in the 2.4 GHz, 5 GHz, and 6 GHz bands. The second link may also be configured in combination of at least one channel included in the 2.4 GHz, 5 GHz, and 6 GHz bands.

According to an embodiment, each of a plurality of STAs may include a processor and a transceiver. For example, the first STA may include a first processor and/or a first transceiver. In addition, the second STA may include a second processor and/or a second transceiver.

As an example, the first STA and the second STA may be controlled by a processor of the MLD, and may operate by the processor of the MLD. For example, the processor of the MLD may request a processor of the first STA to transmit/receive a signal through the first link. The processor of the first STA may transmit/receive a signal through the first link in response to the request.

As another example, the first STA and the second STA may operate independently. For example, the first STA may perform communication through the first link, based on the first processor and the first transceiver. In addition, the second STA may perform communication through the second link, based on the second processor and the second transceiver. The processor of the MLD may transmit information required for a multi-link operation to the first STA or the second STA. The first STA or the second STA may perform the multi-link operation, based on the information required for the multi-link operation.

According to an embodiment, the MLD may be in a state of being connected with an AP MLD. For example, the AP MLD may include a first AP and a second AP. The first STA may be connected with the first AP through the first link. The second STA may be connected with the second AP through the second link. For example, the MLD may perform an association process with respect to the AP MLD. The MLD may establish a connection with the AP MLD, based on the association process, and may obtain an ID for the first link and an ID for the second link.

According to an embodiment, a plurality of links may be classified into a plurality of groups. The plurality of links may be classified into the plurality of groups, based on a characteristic or situation of a link.

For example, the plurality of links may be classified based on whether it is an anchored link. As an example, a first link may operate as an anchored link, and a second link may operate as a non-anchored link. In this case, the first link may be included in a first group. The second link may be included in a second group.

For example, the plurality links may be classified based on whether the link is in a busy state. As an example, the first link may be in the busy state, and the second link may be in an idle state. In this case, the first link may be included in the first group. The second link may be included in the second group.

According to an embodiment, a group identifier (ID) may be assigned to each of the plurality of groups. For example, a first group ID may be assigned to the first group, and a second group ID may be assigned to the second group. According to an embodiment, each the plurality of groups may include only one link. In this case, a group ID may be set to be equal to a link ID.

According to an embodiment, the PPDU may include information related to a group ID assigned to the plurality of groups and information related to a power saving (PS) period assigned to the plurality of groups. For example, the PPDU may include an opportunistic power save (OPS) frame.

For example, the information related to the group ID assigned to the plurality of groups may include information of all of the plurality of groups. As an example, information related to a link included in the group ID may be included in the information related to the group ID assigned to the plurality of groups. In addition, the information related to the PS period assigned to the plurality of groups may include information the PS period for the group ID.

As an example, the PPDU may include a first group ID and a second group ID. The PPDU may include information related to a link included in the first group ID and information related to a link included in the second group ID. In addition, the PPDU may further include information related to a first PS period for the first group ID and information related to a second PS period for the second group ID.

According to an embodiment, the PPDU may further include traffic information for a plurality of links. For example, the traffic information for the plurality of links may include traffic indication map (TIM) information. For example, the traffic information for the plurality of links may indicate whether there is buffered traffic in each of the plurality of links.

In step S3720, the MLD may identify at least one group among the plurality of groups, based on the information related to the group ID assigned to the plurality of groups. For example, the MLD may identify the first group among the plurality of groups, based on the information related to the group ID assigned to the plurality of groups.

In addition, the MLD may identify other groups except for the at least one group, based on the information related to the group ID assigned to the plurality of groups. For example, the MLD may identify the second group among the plurality of groups, based on the information related to the group ID assigned to the plurality of groups.

For example, the MLD may identify at least one group including a link to which a PS period is assigned among a plurality of multi-links. In addition, the MLD may identify other groups including a link to which the PS period is not assigned among the plurality of groups.

As an example, the MLD may identify that the PS period is assigned to a first group including a first link. The MLD may identify that the PS period is not assigned to a second group including a second link.

In step S3730, the MLD may change at least one STA for at least one group included in the MLD to a doze state, based on information related to the PS period assigned to the plurality of groups. For example, the MLD may change STAs included in the first group to the doze state, based on the information related to the PS period assigned to the plurality of groups.

For example, information related to the PS period assigned to the plurality of groups may include information related to the PS period assigned to at least one group. As an example, the at least one STA may change to an awake state after the doze state, based on the information related to the PS period assigned to the at least one group.

As another example, the information related to the PS period assigned to the plurality of groups may include information related to a PS period assigned to other groups except for the at least one group.

As an example, information related to a PS period (hereinafter, a second period) allocated to the other groups may be set differently from a PS period (hereinafter, a first period) assigned to the aforementioned at least one group. Therefore, since the first period and the second period are set to have different lengths, at least one STA for the at least one group and STAs for the other groups may be changed to the awake state at different time points.

As an example, the PS period assigned to the other groups may be set to 0. In other words, the PS period may not be assigned to the other groups. Therefore, only at least one STA for the at least one group may change to the doze state, and STAs for the other groups may remain in the awake state.

A specific example of the MLD described with reference to FIG. 37 may be described hereinafter. A case in which the MLD operates in two links, i.e., a first link and a second link, may be described hereinafter.

The MLD may include a first STA operating in the first link and a second STA operating in the second link.

For example, the first link and the second link may be classified into a first group and a second group, based on whether it is an anchored link. The first link may operate as the anchored link. In addition, the second link may operate as a non-anchored link. Therefore, the first link may be classified into the first group. The second link may be classified into the second group.

The MLD may receive information related to a first ID of the first group, first period assigned to the first group for power saving, second ID of the second group, and second period assigned to the second group goer power saving through a PPDU (e.g., OPS frame).

The MLD may identify the first group and identify the first link included in the first group, based on the first ID. In addition, the MLD may identify the first period assigned to the first group for power saving. The MLD may change the first STA to a doze state, and may change it to the awake state after the first period.

The MLD may identify the second group and identify the second link included in the second group, based on the second ID. In addition, the MLD may identify the second period assigned to the second group for power saving. The MLD may change the second STA to a doze state, and may change it to the awake state after the second period.

Figure 38:
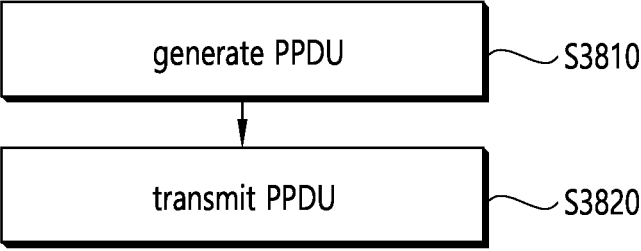
FIG. 38 is a flowchart for describing an operation of an AP MLD.

FIG. 38 is a flowchart for describing an operation of an AP MLD.

Referring to FIG. 38, in step S3810, the AP MLD may generate a PPDU.

According to an embodiment, the AP MLD may operate in a plurality of links. The AP MLD may include a plurality of APs for the plurality of links.

For example, the AP MLD may include a first AP and a second AP. The first AP may relate to a first link. As an example, the first AP may operate in the first link. In other words, the first AP may be connected to the first link. The second AP may relate to a second link. As an example, the second AP may operate in the second link. In other words, the second AP may be connected to the second link.

For example, the first link may be included in one of 2.4 GHz, 5 GHz, and 6 GHz bands. In addition, the second link may also be included in one of the 2.4 GHz, 5 GHz, and 6 GHz bands.

For example, the first link may be configured in combination of at least one channel included in the 2.4 GHz, 5 GHz, and 6 GHz bands. The second link may also be configured in combination of at least one channel included in the 2.4 GHz, 5 GHz, and 6 GHz bands.

According to an embodiment, each of a plurality of APs may include a processor and a transceiver. For example, the first AP may include a first processor and/or a first transceiver. In addition, the second AP may include a second processor and/or a second transceiver.

As an example, the first AP and the second AP may be controlled by a processor of the AP MLD, and may operate by the processor of the AP MLD. For example, the processor of the AP MLD may request a processor of the first AP to transmit/receive a signal through the first link. The processor of the first AP may transmit/receive a signal through the first link in response to the request.

As another example, the first AP and the second AP may operate independently. For example, the first AP may perform communication through the first link, based on the first processor and the first transceiver. In addition, the second AP may perform communication through the second link, based on the second processor and the second transceiver. The processor of the AP MLD may transmit information required for a multi-link operation to the first AP or the second AP. The first AP or the second AP may perform the multi-link operation, based on the information required for the multi-link operation.

According to an embodiment, the AP MLD may be in a state of being connected with the MLD. For example, the MLD may include a first STA and a second STA. The first AP may be connected with the first STA through the first link. The second AP may be connected with the second STA through the second link. For example, the AP MLD may perform an association process with respect to the MLD. The AP MLD may establish a connection with the MLD, based on the association process, and may obtain/configure/transmit an ID for the first link and an ID for the second link. Each of the ID for the first link and the ID for the second link may be set with 4 bits.

According to an embodiment, a plurality of links may be classified into a plurality of groups. The plurality of links may be classified into the plurality of groups, based on a characteristic or situation of a link.

For example, the plurality of links may be classified based on whether it is an anchored link. As an example, a first link may operate as an anchored link, and a second link may operate as a non-anchored link. In this case, the first link may be included in a first group. The second link may be included in a second group.

For example, the plurality links may be classified based on whether the link is in a busy state. As an example, the first link may be in the busy state, and the second link may be in an idle state. In this case, the first link may be included in the first group. The second link may be included in the second group.

According to an embodiment, a group identifier (ID) may be assigned to each of the plurality of groups. For example, a first group ID may be assigned to the first group, and a second group ID may be assigned to the second group. According to an embodiment, each the plurality of groups may include only one link. In this case, a group ID may be set to be equal to a link ID.

According to an embodiment, the PPDU may include information related to a group ID assigned to the plurality of groups and information related to a PS period assigned to the plurality of groups. For example, the PPDU may include an opportunistic power save (OPS) frame.

For example, the information related to the group ID assigned to the plurality of groups may include information of all of the plurality of groups. As an example, information related to a link included in the group ID may be included in the information related to the group ID assigned to the plurality of groups. In addition, the information related to the PS period assigned to the plurality of groups may include information the PS period for the group ID.

As an example, the PPDU may include a first group ID and a second group ID. In addition, the PPDU may further include information related to a first PS period for the first group ID and information related to a second PS period for the second group ID.

According to an embodiment, the PPDU may further include traffic information for a plurality of links. For example, the traffic information for the plurality of links may include traffic indication map (TIM) information. For example, the traffic information for the plurality of links may indicate whether there is buffered traffic in each of the plurality of links.

The aforementioned technical feature of the present specification may be applied to various apparatuses and methods. For example, the aforementioned technical feature of the present specification may be performed/supported through the device of FIG. 1 and/or FIG. 19. For example, the aforementioned technical feature of the present specification may be applied only to part of FIG. 1 and/or FIG. 19. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 19. For example, an apparatus of the present specification may include a processor and a memory coupled to the processor. The processor may be adapted to: receive a physical layer protocol unit (PPDU), wherein the PPDU includes information related to a group identifier (ID) assigned to the plurality of groups and information related to a power saving (PS) period assigned to the plurality of groups, and wherein the plurality of links are classified into a plurality of groups; identify at least one group among the plurality of groups, based on the information related to the group ID assigned to the plurality of groups; and change at least one station (STA) for the at least one group included in the MLD to a doze state, based on information related to the PS period assigned to the plurality of groups.

The technical feature of the present specification may be implemented based on a computer readable medium (CRM). For example, the CRM proposed in the present specification may be encoded with at least one computer program including instructions. The instruction, when executed by at least one processor, may cause the at least one processor to perform operations including: receiving a PPDU, wherein the PPDU includes information related to a group ID assigned to the plurality of groups and information related to a PS period assigned to the plurality of groups, and wherein the plurality of links are classified into a plurality of groups; identifying at least one group among the plurality of groups, based on the information related to the group ID assigned to the plurality of groups; and changing at least one STA for the at least one group included in the MLD to a doze state, based on information related to the PS period assigned to the plurality of groups. The instruction stored in the CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a multi-link device (MLD) comprising:

transmitting, by a station (STA) affiliated with the MLD related to a plurality of links including a first link and a second link, an Association Request frame that includes a first information field related to whether the MLD supports a simultaneous transmit and receive operation, a second information field related to an available traffic identifier (TID) in at least one of the first link and the second link, and a third information field related to a maximum number of links supported by the MLD;

receiving, by the STA, a physical layer protocol unit (PPDU) based on the Association Request frame, wherein the PPDU includes a legacy signal (L-SIG) field, a repeated L-SIG (RL-SIG) field being contiguous to the L-SIG field, and a first signal (SIG) field being contiguous to the RL-SIG field, wherein the L-SIG field includes a length field, and the length field has a value of satisfying a condition that a remainder is zero (0) when the value of the length field is divided by three (3), and wherein the first SIG field includes first bit information related to a PPDU type, second bit information related to an identifier of a basic service set (BSS), third bit information indicating duration information related to a transmission opportunity (TXOP), fourth bit information related to whether the PPDU is sent in uplink (UL) or in downlink (DL), fifth bit information related to a bandwidth, and sixth bit information having a length of 3 bits and indicating a physical (PHY) version of the PPDU, wherein the plurality of links are classified into a plurality of groups, and wherein the PPDU includes first information related to a group identifier (ID) assigned to the plurality of groups and second information related to a power saving (PS) period assigned to the plurality of groups; and changing, by the STA, a power state of at least one of the plurality of links to a doze state, based on the first information and the second information.

2. The method of claim 1, wherein the plurality of links are classified based on whether it is an anchored link.

3. The method of claim 1, wherein the PPDU further includes traffic information related to the plurality of links.

4. The method of claim 3, wherein the traffic information for the plurality of links includes traffic indication map (TIM) information.

5. A multi-link device (MLD), comprising at least one processor supporting a plurality of links including a first link and a second link; and at least one computer memory operatively connected to the at least one processor and storing instructions that, based on being executed by the at least one processor, perform operations comprising:

transmitting, by a station (STA) affiliated with the MLD, an Association Request frame that includes a first information field related to whether the MLD supports a simultaneous transmit and receive operation, a second information field related to an available traffic identifier (TID) in at least one of the first link and the second link, and a third information field related to a maximum number of links supported by the MLD;

receiving a physical layer protocol unit (PPDU) based on the Association Request frame, wherein the PPDU includes a legacy signal (L-SIG) field, a repeated L-SIG (RL-SIG) field being contiguous to the L-SIG field, and a first signal (SIG) field being contiguous to the RL-SIG field, wherein the L-SIG field includes a length field, and the length field has a value of satisfying a condition that a remainder is zero (0) when the value of the length field is divided by three (3), and wherein the first SIG field includes first bit information related to a PPDU type, second bit information related to an identifier of a basic service set (BSS), third bit information indicating duration information related to a transmission opportunity (TXOP), fourth bit information related to whether the PPDU is sent in uplink (UL) or in downlink (DL), fifth bit information related to a bandwidth, and sixth bit information having a length of 3 bits and indicating a physical (PHY) version of the PPDU, wherein the plurality of links are classified into a plurality of groups, and wherein the PPDU includes first information related to a group identifier (ID) assigned to the plurality of groups and second information related to a power saving (PS) period assigned to the plurality of groups; and changing a power state of at least one of the plurality of links to a doze state based on the first information and the second information.

6. The device of claim 5, wherein the plurality of links are classified based on whether it is an anchored link.

7. The device of claim 5, wherein the PPDU further includes traffic information related to the plurality of links.

8. The device of claim 7, wherein the traffic information for the plurality of links includes traffic indication map (TIM) information.

* * * * *